US012079656B2

(12) United States Patent
Uemura et al.

(10) Patent No.: US 12,079,656 B2
(45) Date of Patent: Sep. 3, 2024

(54) COOPERATION SYSTEM, FIRST TERMINAL DEVICE, AND SECOND TERMINAL DEVICE

(71) Applicant: CITIZEN WATCH CO., LTD., Nishitokyo (JP)

(72) Inventors: Ryutaro Uemura, Nishitokyo (JP); Daisuke Matsuoh, Nishitokyo (JP)

(73) Assignee: CITIZEN WATCH CO., LTD., Nishitokyo (JP)

( * ) Notice: Subject to any disclaimer, the term of this patent is extended or adjusted under 35 U.S.C. 154(b) by 103 days.

(21) Appl. No.: 17/267,561

(22) PCT Filed: Aug. 27, 2019

(86) PCT No.: PCT/JP2019/033507
§ 371 (c)(1),
(2) Date: Feb. 10, 2021

(87) PCT Pub. No.: WO2020/045423
PCT Pub. Date: Mar. 5, 2020

(65) Prior Publication Data
US 2021/0318902 A1    Oct. 14, 2021

(30) Foreign Application Priority Data

Aug. 31, 2018  (JP) .................................. 2018-163264
Aug. 20, 2019  (JP) .................................. 2019-150169

(51) Int. Cl.
*G06F 9/48*   (2006.01)
*G06F 9/50*   (2006.01)

(52) U.S. Cl.
CPC .............. *G06F 9/48* (2013.01); *G06F 9/4806* (2013.01); *G06F 9/4843* (2013.01); *G06F 9/485* (2013.01);
(Continued)

(58) Field of Classification Search
CPC ........ G06F 9/48; G06F 9/4806; G06F 9/4843; G06F 9/485; G06F 9/4881; G06F 9/50;
(Continued)

(56) References Cited

U.S. PATENT DOCUMENTS 6,243,858 B1    6/2001  Mizoguchi et al.
11,191,432 B2 *  12/2021  Chang .................... A61B 5/103
(Continued)

FOREIGN PATENT DOCUMENTS

JP        11-39145 A     2/1999
JP     2016-145805 A     8/2016
(Continued)

OTHER PUBLICATIONS

Japanese Notice of Reasons for Refusal for JP 2019-150169 dated Nov. 4, 2020.
(Continued)

*Primary Examiner* — Charles M Swift
(74) *Attorney, Agent, or Firm* — Sughrue Mion, PLLC

(57) ABSTRACT

A cooperation system includes a first terminal device and a second terminal device. The first terminal device acquires output information defined by a service block program or information for generating the output information from an external device in accordance with a trigger generated by a trigger generation unit of the second terminal device, and generates an action command for causing an action execution unit defined by an action block program to execute an action based on the acquired information. With this configuration, a service can be properly provided.

11 Claims, 14 Drawing Sheets

(52) U.S. Cl.
CPC .............. *G06F 9/4881* (2013.01); *G06F 9/50* (2013.01); *G06F 9/5005* (2013.01); *G06F 9/5044* (2013.01); *G06F 9/5055* (2013.01); *G06F 9/5061* (2013.01)

(58) Field of Classification Search
CPC .... G06F 9/5005; G06F 9/5044; G06F 9/5055; G06F 9/5061
See application file for complete search history.

(56) References Cited

U.S. PATENT DOCUMENTS

| | | |
|---|---|---|
| 2014/0173443 A1 | 6/2014 | Hawkins, III et al. |
| 2014/0289356 A1 | 9/2014 | Imamura |
| 2016/0321325 A1 | 11/2016 | Wang et al. |
| 2017/0115633 A1 | 4/2017 | Poguntke et al. |
| 2017/0176950 A1 | 6/2017 | Jung et al. |
| 2017/0235731 A1 | 8/2017 | Kurapati et al. |
| 2018/0062691 A1* | 3/2018 | Barnett, Jr. ............. G06F 3/167 |
| 2018/0310136 A1* | 10/2018 | Xu ........................... H04W 4/33 |
| 2019/0182749 A1* | 6/2019 | Breaux ................ H04W 4/027 |

FOREIGN PATENT DOCUMENTS

| | | |
|---|---|---|
| JP | 2017-517829 A | 6/2017 |
| JP | 6237802 B2 | 11/2017 |
| JP | 2018-503289 A | 2/2018 |
| WO | 2016/081764 A1 | 5/2016 |

OTHER PUBLICATIONS

International Search Report for PCT/JP2019/033507 dated Oct. 29, 2019 [PCT/ISA/210].
Office Action dated Jun. 2, 2022 issued by the Chinese Patent Office in Chinese Application No. 201980056642.4.
Office Action issued Mar. 1, 2022 in Japanese Application No. 2021-073970.
Extended European Search Report dated Apr. 14, 2022 in European Application No. 19853472.9.
Office Action dated Jan. 4, 2023 from the Chinese Patent Office in Application No. 201980056642.4.
Decision of Rejection dated Mar. 31, 2023 from the Chinese Patent Office in App. No. 201980056642.4.
Office Action dated May 3, 2023 from the European Patent Office in Application No. 19 853 472.9.
Communication dated Feb. 27, 2024, issued in European Application No. 19 853 472.9.

* cited by examiner

COOPERATION SYSTEM, FIRST TERMINAL DEVICE, AND SECOND TERMINAL DEVICE

CROSS REFERENCE TO RELATED APPLICATIONS

This application is a National Stage of International Application No. PCT/JP2019/033507 filed Aug. 27, 2019, claiming priority from Japanese Patent Application No. 2018-163264 filed Aug. 31, 2018 and Japanese Patent Application No. 2019-150169 filed Aug. 20, 2019, the entire contents of which are incorporated in their entirety.

FIELD

The present invention relates to a cooperation system, a first terminal device, and a second terminal device.

BACKGROUND

As a technique related to a conventional cooperation system that causes a plurality of terminal devices to cooperate with each other, for example, Patent Literature 1 discloses a terminal control system including a first terminal, a second terminal, and a server on a network. The first terminal and the second terminal are configured to be able to connect with each other via short-range wireless communication. The server is connected to the second terminal via a communication line. This server includes a storage unit and a terminal control unit. The storage unit stores a plurality of kinds of type information of behavior that is determined based on action of a user detected by the first terminal and processing commands to be executed by the second terminal in association with each other. At the time of receiving the type information of predetermined behavior from the second terminal, the terminal control unit transmits any one of a plurality of kinds of processing commands stored in the storage unit to the second terminal to be executed based on the type information of the predetermined behavior.

CITATION LIST

Patent Literature

Patent Literature 1: Japanese Patent No. 6237802

SUMMARY

Technical Problem

As the terminal control system disclosed in Patent Literature 1 described above, for example, desired is a system that can provide more versatile services more properly.

The present invention is made in view of such a situation, and an object of the present invention is to provide a cooperation system, a first terminal device, and a second terminal device capable of providing services properly.

Solution to Problem

In order to solve the above mentioned problem, a cooperation system according to the present invention includes a first terminal device configured to store an application program including a service block program that defines output information output from an operation target device, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action; and a second terminal device that is configured to be able to communicate with the first terminal device and includes a plurality of trigger generation unit candidates as candidates for the trigger generation unit, the trigger generation unit being defined from among the trigger generation unit candidates by the trigger block program, wherein the first terminal device is able to communicate with an external device, acquires the output information defined by the service block program or information for generating the output information from the external device in accordance with the trigger generated by the trigger generation unit, and generates an action command for causing the action execution unit defined by the action block program to execute the action based on the acquired information.

Further, in the cooperation system, it is possible to configure that the second terminal device includes the action execution unit that executes the action by the action command, and the first terminal device transmits the action command to the second terminal device.

Further, in the cooperation system, it is possible to configure that the trigger generation unit candidates include an input unit configured to receive an input to the second terminal device, and the trigger is that an input determined in advance is performed on the input unit in a case in which the input unit is set as the trigger generation unit.

Further, in the cooperation system, it is possible to configure that the trigger generation unit candidates include a detection unit configured to detect physical quantity in the second terminal device, and the trigger is that the physical quantity detected by the detection unit reaches a value determined in advance in a case in which the detection unit is set as the trigger generation unit.

Further, in the cooperation system, it is possible to configure that the first terminal device stores a plurality of the application programs, and the second terminal device is able to switch the application programs to be executed.

Further, in the cooperation system, it is possible to configure that the second terminal device includes a plurality of action execution unit candidates as candidates for the action execution unit, and the action execution unit is defined from among the action execution unit candidates by the action block program.

Further, in the cooperation system, it is possible to configure that the action execution unit is an indicator configured to indicate the output information.

Further, in the cooperation system, it is possible to further include a plurality of the second terminal devices, and to configure that among the second terminal devices, the second terminal device in which the trigger generation unit is defined by the trigger block program is different from the second terminal device in which the action execution unit is defined by the action block program.

Further, in the cooperation system, it is possible to further include a plurality of the first terminal devices, and to configure that among the first terminal devices, the action command generated by any of the first terminal devices is relayed by another one of the first terminal devices to be transmitted to the second terminal device.

Further, in the cooperation system, it is possible to further include a plurality of the first terminal devices, and to configure that among the first terminal devices, the first terminal device configured to inquire of the external device the output information or the information for generating the output information in accordance with the trigger generated by the trigger generation unit is different from the first terminal device configured to acquire the output information or the information for generating the output information from the external device, generate the action command based on the acquired information, and transmit the action command to the second terminal device including the action execution unit.

Further, in the cooperation system, it is possible to further include the external device configured to be able to communicate with the first terminal device.

In order to solve the above mentioned problem, a first terminal device according to the present invention includes a storage unit configured to store an application program including a service block program that defines output information output from an operation target device, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action; a communication unit configured to be able to communicate with an external device, and a second terminal device including a plurality of trigger generation unit candidates as candidates for the trigger generation unit, the trigger generation unit being defined from among the trigger generation unit candidates by the trigger block program; and a processing unit configured to be able to perform processing of acquiring the output information defined by the service block program or information for generating the output information from the external device in accordance with the trigger generated by the trigger generation unit, and generating an action command for causing the action execution unit defined by the action block program to execute the action based on the acquired information.

In order to solve the above mentioned problem, a second terminal according to the present invention includes a communication unit configured to be able to communicate with a first terminal device configured to store an application program including a service block program that defines output information output from an operation target device, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action; the trigger generation unit; and the action execution unit, wherein the trigger generation unit is defined from among a plurality of trigger generation unit candidates as candidates for the trigger generation unit by the trigger block program, the first terminal device acquires the output information defined by the service block program or information for generating the output information from an external device in accordance with the trigger generated by the trigger generation unit, and generates an action command for causing the action execution unit defined by the action block program to execute the action based on the acquired information, and the action execution unit executes the action by the action command that is received from the first terminal device by the communication unit.

Advantageous Effects of Invention

The cooperation system according to the present invention includes a first terminal device and a second terminal device. The first terminal device stores an application program constituted of a service block program, a trigger block program, and an action block program. The second terminal device can communicate with the first terminal device, and a trigger generation unit is defined by the trigger block program from among a plurality of trigger generation unit candidates. The first terminal device can communicate with an external device, and acquires output information defined by the service block program or information for generating the output information from the external device in accordance with a trigger generated by the trigger generation unit of the second terminal device. The first terminal device then generates an action command for causing an action execution unit defined by the action block program to execute an action based on the acquired output information or output information that is generated from the information for generating the output information. As a result, the cooperation system, the first terminal device, and the second terminal device exhibit an effect of being able to provide a service properly.

DESCRIPTION OF EMBODIMENTS

The following describes embodiments according to the present invention in detail based on the drawings. The present invention is not limited to the embodiments. Constituent elements in the following embodiments encompass a constituent element that is easily replaceable by those skilled in the art, or substantially the same constituent element.

First Embodiment

Outline of Cooperation System

Figure 1:
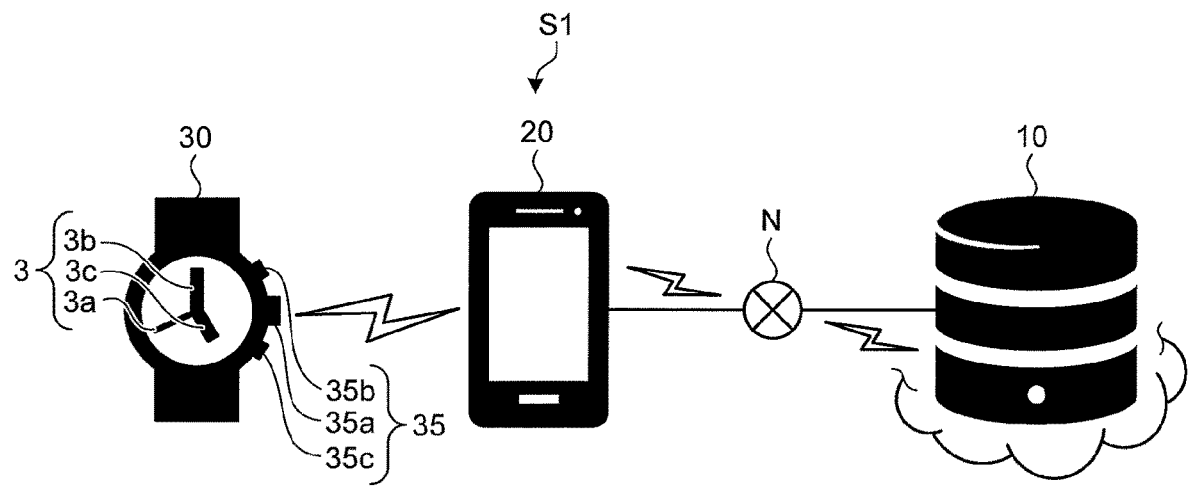
FIG. 1 is a block diagram illustrating a schematic configuration of a cooperation system according to a first embodiment.

A cooperation system S1 according to the present embodiment illustrated in FIG. 1 includes an external device 10, a first terminal device 20, and a second terminal device 30. The cooperation system S1 according to the present embodiment is a system that can properly provide versatile services when application programs are executed and communicate with each other to cooperate with each other. Typically, the first terminal device 20 constitutes a master communication terminal that communicates with the external device 10 via a network N.

On the other hand, the second terminal device 30 constitutes a slave communication terminal that communicates with the first terminal device 20 via short-range wireless communication. The network N includes an optional communication network regardless of wireless communication using Wi-Fi (registered trademark), 4G, 5G, and the like, or wired communication using a communication line, and connects the external device 10 with the first terminal device 20 in a communicable manner. Examples of a scheme of short-range wireless communication include Bluetooth (registered trademark), W-LAN, Wi-Fi (registered trademark), Near Field Communication (NFC), and the like. However, the second terminal device 30 may have a configuration of being able to communicate with the external device 10 and the first terminal device 20 via the network N instead of short-range wireless communication. Herein, the external device 10 is described as a device configuring part of the cooperation system S1, but the embodiment is not limited thereto. For example, a device configuring part of another system may also be used as the external device 10 at the same time. The following describes configurations of the cooperation system S1 in detail with reference to the respective drawings.

<Basic Configuration of External Device>

The external device 10 constitutes a cloud service device (cloud server) implemented on the network N. The external device 10 includes an electronic circuit that is mainly constituted of a well-known microcomputer including a central processing unit such as a CPU, various storage devices, and the like. The external device 10 can also be configured by installing a computer program for implementing various kinds of processing in a computer system such as a known PC or a workstation. The external device 10 may be configured by a single device, or may be configured by combining a plurality of devices in a mutually communicable manner.

Figure 2:
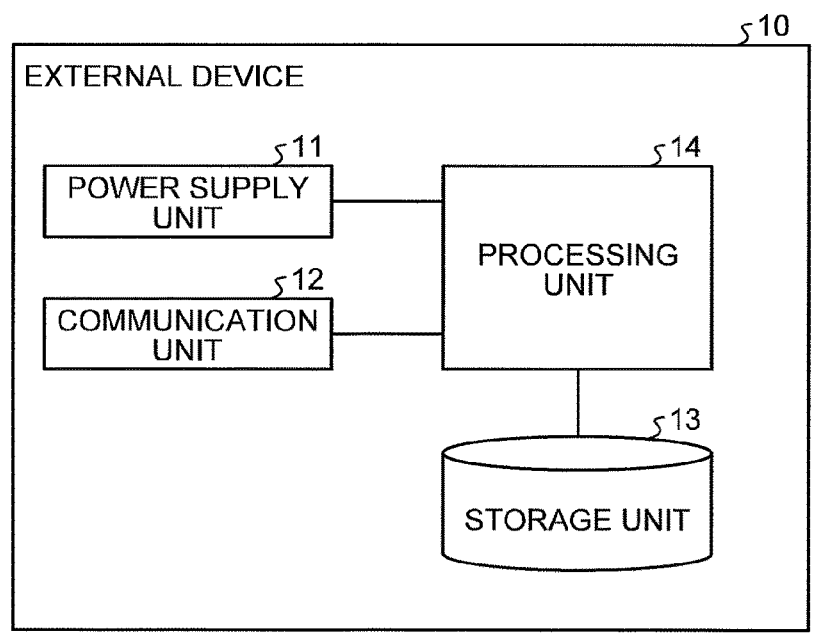
FIG. 2 is a block diagram illustrating a schematic configuration of an external device included in the cooperation system according to the first embodiment.

Specifically, as illustrated in FIG. 2, the external device 10 includes a power supply unit 11, a communication unit 12, a storage unit 13, and a processing unit 14.

The power supply unit 11 is a power source of the external device 10. For example, the power supply unit 11 supplies electric power to respective parts of the external device 10 from a commercial power supply and the like.

The communication unit 12 is a communication module that can communicate with the outside of the external device 10. The communication unit 12 is connected to the network N in a communicable manner regardless of wireless communication or wired communication, and communicates with the first terminal device 20 and the like via the network N.

The storage unit 13 is a storage device such as a ROM, a RAM, and a semiconductor memory incorporated in the external device 10. Typically, the storage unit 13 has relatively large storage capacity as compared with a storage unit 26 of the first terminal device 20, a storage unit 38 of the second terminal device 30, and the like (described later). The storage unit 13 stores conditions and information required for various kinds of processing performed by the external device 10, various application programs executed by the external device 10, control data, and the like. The storage unit 13 according to the present embodiment stores various kinds of information required for various services of the cooperation system S1. These pieces of information are read out from the storage unit 13 by the processing unit 14 and the like as needed. Additionally, the storage unit 13 according to the present embodiment also stores a plurality of application programs (applets described later) that can be downloaded to the first terminal device 20. The application programs stored in the storage unit 13 can be downloaded to the first terminal device 20 to be used via the network N and the like. The applets (described later) may be directly stored in the first terminal device 20 not using the storage unit 13 of the external device 10 as described later.

The processing unit 14 is electrically connected to respective parts of the external device 10, and integrally controls the respective parts of the external device 10. The processing unit 14 includes an electronic circuit that is mainly constituted of a well-known microcomputer including a central processing unit such as a CPU. The processing unit 14 is connected to the respective parts of the external device 10 in a communicable manner, and can exchange various signals with the respective parts. The processing unit 14 executes various application programs stored in the storage unit 13, and causes the respective parts of the external device 10 to operate by operation of the application program to perform various kinds of processing for implementing various functions. The processing unit 14 according to the present embodiment performs various kinds of processing required for various services of the cooperation system S1.

<Basic Configuration of First Terminal Device>

The first terminal device 20 is an electronic device that can be carried by a user, and is an operation target device operated by the application program (applet) (described later). The first terminal device 20 can receive various services from the external device 10 by communicating with the external device 10 to cooperate with each other. The first terminal device 20 can include, for example, a smartphone, a tablet PC, a notebook PC, a PDA, a portable game machine, and the like. In the example of FIG. 1, the first terminal device 20 is illustrated as a smartphone.

Figure 3:
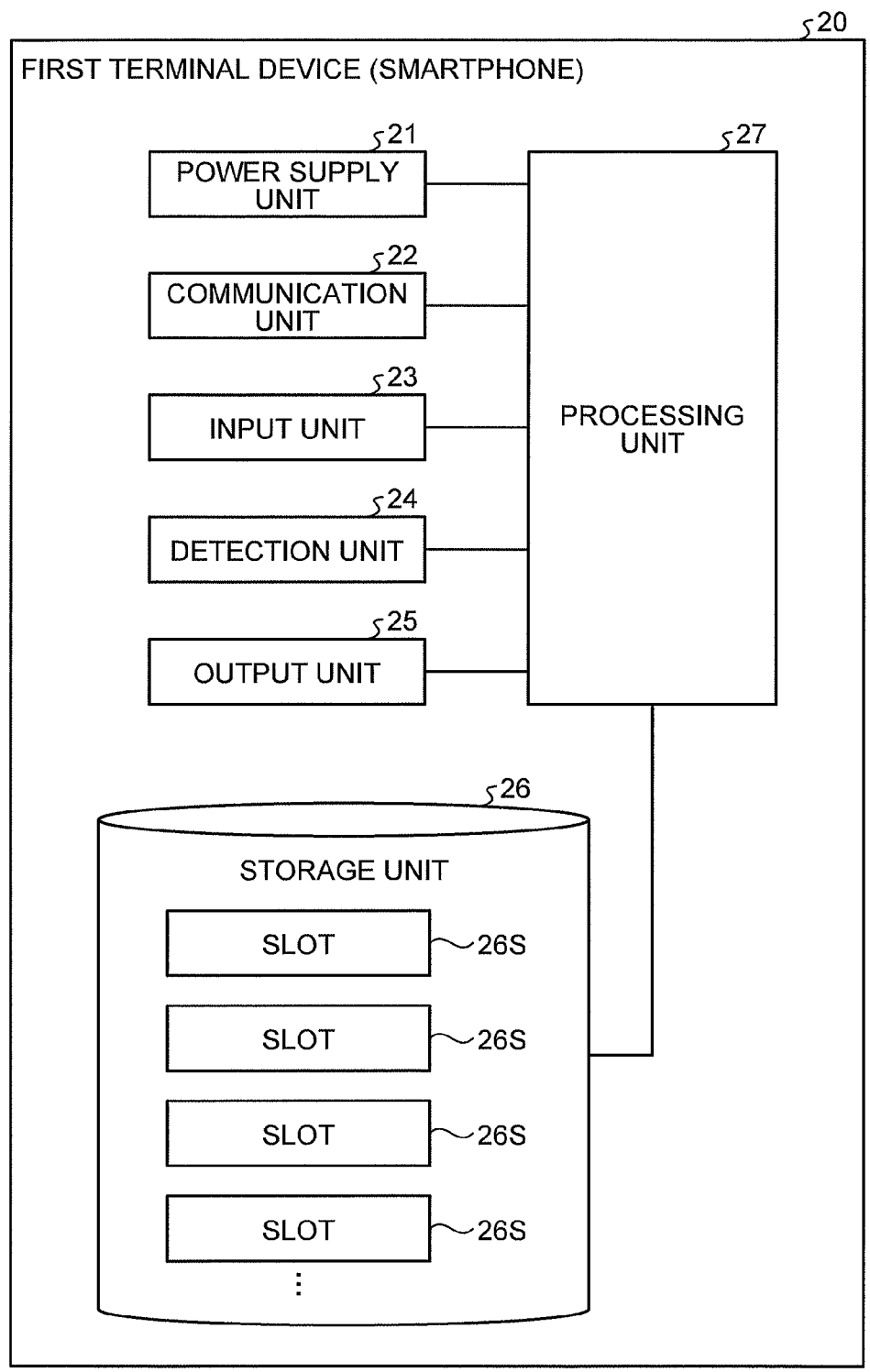
FIG. 3 is a block diagram illustrating a schematic configuration of a first terminal device included in the cooperation system according to the first embodiment.

Specifically, as illustrated in FIG. 3, the first terminal device 20 includes a power supply unit 21, a communication unit 22, an input unit 23, a detection unit 24, an output unit 25, the storage unit 26, and a processing unit 27.

The power supply unit 21 is a power source of the first terminal device 20. The power supply unit 21 includes a chargeable/dischargeable secondary cell such as a lithium ion battery, and supplies electric power to the respective parts in the first terminal device 20.

The communication unit 22 is a communication module that can communicate with the outside of the first terminal device 20. The communication unit 22 is connected to the network N in a communicable manner regardless of wireless communication or wired communication, and communicates with the external device 10 via the network N. The communication unit 22 also communicates with the second terminal device 30 via short-range wireless communication.

The input unit 23 is a portion that receives various inputs to the first terminal device 20. The input unit 23 includes, for example, a touch panel (for example, refer to a touch panel 23a that is described later with reference to FIG. 16 and the other drawings), an operation button, and the like that receive operation inputs to the first terminal device 20. For example, the input unit 23 may also include a voice input device that receives a voice input to the first terminal device 20.

The detection unit 24 is a detection unit that detects various kinds of information (physical quantity) in the first terminal device 20. The detection unit 24 includes, for example, an acceleration sensor that detects acceleration working on the first terminal device 20, an illuminance sensor that detects illuminance of light applied to the first terminal device 20, a temperature sensor that detects a temperature of the vicinity of the first terminal device 20, a voltage sensor that detects a power supply voltage and the like of the power supply unit 21, a positioning device that measures a present position of the first terminal device 20, and the like.

The output unit 25 is a portion that performs various outputs in the first terminal device 20. The output unit 25 includes, for example, a display that outputs image information (for example, refer to a display 25a that is described later with reference to FIG. 16 and the other drawings), a pilot lamp that outputs visual information, a speaker/alarm buzzer that outputs sound information, a vibrator that outputs vibration information, and the like. The touch panel 23a that is described later with reference to FIG. 16 and the other drawings is disposed to be superimposed on a surface of the display 25a.

The storage unit 26 is a storage device such as a ROM, a RAM, and a semiconductor memory incorporated in the first terminal device 20. The storage unit 26 stores conditions and information required for various kinds of processing performed by the first terminal device 20, various application programs executed by the first terminal device 20, control data, and the like. The storage unit 26 can also store various kinds of information received by the communication unit 22, various kinds of information input via the input unit 23, various kinds of information detected by the detection unit 24, various kinds of information output by the output unit 25, and the like. These pieces of information are read out from the storage unit 26 by the processing unit 27 and the like as needed. The storage unit 26 according to the present embodiment includes a plurality of slots 26S as storage regions that are divided to individually store the application programs. The application program and the slot 26S will be described later in detail.

The processing unit 27 is electrically connected to respective parts of the first terminal device 20, and integrally controls the respective parts of the first terminal device 20. The processing unit 27 includes an electronic circuit that is mainly constituted of a well-known microcomputer including a central processing unit such as a CPU. The processing unit 27 is connected to the respective parts of the first terminal device 20 in a communicable manner, and can exchange various signals with the respective parts. The processing unit 27 executes various application programs stored in the storage unit 26, and causes the respective parts of the first terminal device 20 to operate by operation of the application program to perform various kinds of processing for implementing various functions.

Basic Configuration of Second Terminal Device

The second terminal device 30 is an electronic device that can be carried by the user, and is an operation target device operated by the application program (applet) (described later). The second terminal device 30 can receive various services together with the first terminal device 20 by communicating and cooperating with the first terminal device 20. The second terminal device 30 according to the present embodiment is paired with the first terminal device 20 in a communicable manner in accordance with various pairing operations. For example, the second terminal device 30 can include a smartphone, a tablet PC, a notebook PC, a PDA, a portable game machine, and the like, but herein, it is preferable that the second terminal device 30 includes a wearable device that is smaller than the first terminal device 20 and can be put on a human body. Examples of the wearable device include devices of a wristband-type, a spectacle-type, a ring-type, a shoes-type, a pendant-type, and the like. In the example of FIG. 1, the second terminal device 30 is illustrated as a wristband-type wearable device that is put on an arm, and is an electronic watch (wristwatch) that displays a time. The second terminal device 30 illustrated in FIG. 1 is an analog electronic watch (analog quartz watch) that displays a time by indicating an index (division) on a dial plate by a physical indicator 3 (a second hand 3a, a minute hand 3b, and an hour hand 3c). The second terminal device 30 is not limited thereto, and may be a digital electronic watch (digital quartz watch) that digitally displays a time, a combination electronic watch (combination quartz watch) partially including digital display together with analog indicator display, and the like.

Figure 4:
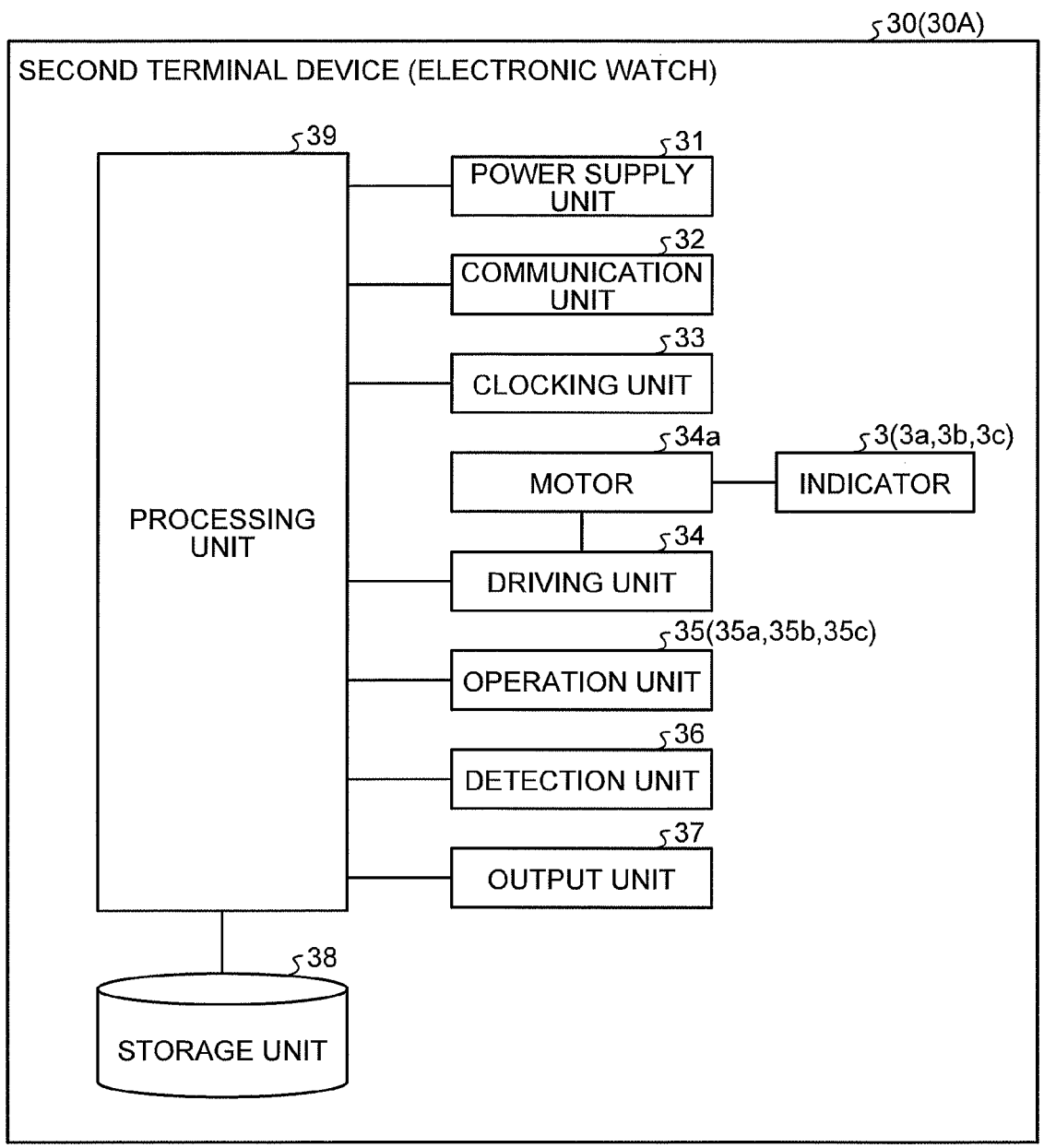
FIG. 4 is a block diagram illustrating a schematic configuration of a second terminal device included in the cooperation system according to the first embodiment.

More specifically, as illustrated in FIG. 4, the second terminal device 30 includes a power supply unit 31, a communication unit 32, a clocking unit 33, a driving unit 34, an operation unit 35 as an input unit, a detection unit 36, an output unit 37, the storage unit 38, and a processing unit 39.

The power supply unit 31 is a power source of the second terminal device 30. The power supply unit 31 includes a chargeable/dischargeable secondary cell such as a lithium ion battery and a power generation element that can generate electric power such as a solar cell, and supplies electric power to the respective parts in the second terminal device 30.

The communication unit 32 is a communication module that can communicate with the outside of the second terminal device 30. The communication unit 32 communicates with the first terminal device 20 via short-range wireless communication. Alternatively, the communication unit 22 may have a configuration of being connected to the network N in a communicable manner regardless of wireless communication or wired communication, and communicating with the external device 10 and the first terminal device 20 via the network N.

The clocking unit 33 is a circuit that clocks a time (watch internal time) to be displayed by the indicator 3. The clocking unit 33 includes, for example, an oscillator, an oscillator circuit, a compensating circuit, a frequency divider circuit, and the like, generates a clock signal having a predetermined frequency as a standard of clocking within the second terminal device 30, and performs clocking by counting pulses included in the clock signal.

The driving unit 34 is a circuit that rotates and drives the indicator 3. The driving unit 34 causes a motor (for example, a stepping motor) 34a to operate by electric power supplied from the power supply unit 31. Rotational force generated by the motor 34a is transmitted to the indicator 3 via wheelwork and the like, and the indicator 3 is rotated and driven. The motor 34a may be individually provided to each of the indicators 3, or may be used by some of the indicators 3 at the same time.

The operation unit 35 is a portion that receives external operations as various inputs to the second terminal device 30. The operation unit 35 includes a crown 35a, push buttons 35b and 35c, and the like that are disposed to project from an outer peripheral surface of an exterior case. The operation unit 35 receives various operations when respective parts in the exterior case work together in accordance with a pulling-out/rotating operation on the crown 35a or a pressing-down operation on the push buttons 35b and 35c. The operation unit 35 may further include a register ring and the like.

The detection unit 36 is a detection unit that detects various kinds of information (physical quantity) in the second terminal device 30. The detection unit 36 includes, for example, an acceleration sensor that detects acceleration working on the second terminal device 30, an illuminance sensor that detects illuminance of light applied to the second terminal device 30, a temperature sensor that detects a temperature of the vicinity of the second terminal device 30, a voltage sensor that detects a power supply voltage of the power supply unit 31 and detects whether electric power is generated, a positioning device that measures a present position of the second terminal device 30, and the like.

The output unit 37 is a portion that performs various outputs other than a time in the second terminal device 30. The output unit 25 includes, for example, a pilot lamp that outputs visual information, a speaker/alarm buzzer that outputs sound information, a vibrator that outputs vibration information, and the like. In a case in which the second terminal device 30 is a digital electronic watch or a combination electronic watch, the output unit 37 may include a display that outputs image information including a time and function selection in a digital format in place of the physical indicator 3.

The storage unit 38 is a storage device such as a ROM, a RAM, and a semiconductor memory incorporated in the second terminal device 30. Typically, storage capacity of the storage unit 38 is relatively smaller than that of the storage unit 26 of the first terminal device 20 described above. The storage unit 38 stores conditions and information required for various kinds of processing performed by the second terminal device 30, various application programs executed by the first terminal device 20, control data, and the like. The storage unit 38 can also store various kinds of information received by the communication unit 32, clocking information clocked by the clocking unit 33, various kinds of information detected by the detection unit 36, various kinds of information output by the output unit 37, and the like. These pieces of information are read out from the storage unit 38 by the processing unit 39 and the like as needed.

The processing unit 39 is electrically connected to respective parts of the second terminal device 30, and integrally controls the respective parts of the second terminal device 30. The processing unit 39 includes an electronic circuit that is mainly constituted of a well-known microcomputer including a central processing unit such as a CPU. The processing unit 39 is connected to the respective parts of the second terminal device 30 in a communicable manner, and can exchange various signals with the respective parts. The processing unit 39 executes various application programs stored in the storage unit 38, and causes the respective parts of the second terminal device 30 to operate by operation of the application programs to perform various kinds of processing for implementing various functions. For example, the processing unit 39 performs processing of controlling the motor 34a by the driving unit 34 based on a time clocked by the clocking unit 33, rotating the indicator 3 to operate hands, and causing the indicator 3 to display the clocked time as a current time. The processing unit 39 also performs, for example, various kinds of processing in accordance with content of an operation performed on the operation unit 35 (the crown 35a, the push buttons 35b and 35c) by the user.

Basic Configuration of Application Program
(Applet)

Next, the following describes the application program executed by the cooperation system S1 described above. Typically, the application program is a computer program having a relatively small size that is incorporated and executed in another application program such as a browser of the first terminal device 20 and the like as an operation target device. Herein, by way of example, the application program is assumed to be an applet executed on the browser. Typically, the applet is regarded as an application program the sequence of which is determined. In the following description, the application program executed by the cooperation system S1 may be referred to as an "applet".

The applet according to the present embodiment is a computer program that is executed by the operation target device to cause the operation target device to operate. The applet may be a computer program to cause the operation target device to independently perform a predetermined operation, or may be a computer program to cause a plurality of the operation target devices to cooperate with each other to perform a predetermined operation. The operation target devices according to the present embodiment are the first terminal device 20 and the second terminal device 30. Typically, the applet is executed by the processing unit 27 and the processing unit 39 to cause the first terminal device 20 and the second terminal device 30 to cooperate with each other to perform a predetermined operation. The applet according to the present embodiment includes a plurality of block programs. Herein, the applet includes a service block program, a trigger block program, and an action block program, and one applet is constructed by combining these three elements. In the following description, the service block program may be referred to as a "service block", the trigger block program may be referred to as a "trigger block", and the action block program may be referred to as an "action block".

The service block is a computer program that defines output information that is output by the operation target device in accordance with service content corresponding to an object desired by the user. In other words, the service block is a computer program that specifies content of output information that is desired to be acquired in accordance with the service content.

The trigger block is a computer program that defines content of a trigger for starting an action for outputting output information corresponding to the service content and a trigger generation unit that generates the trigger, and causes the trigger generation unit to generate the trigger. Herein, the trigger is a cue for starting an action corresponding to the service content, and generated by the trigger generation unit. The trigger generation unit is provided in the operation target device (the first terminal device 20 or the second terminal device 30) to generate the trigger. By way of example, as a trigger generation unit candidate that may constitute the trigger generation unit in the first terminal device 20 and the second terminal device 30 constituting the operation target device, exemplified are the input unit 23, the detection unit 24, and the processing unit 27 of the first terminal device 20, and the clocking unit 33, the operation unit 35, the detection unit 36, and the processing unit 39 of the second terminal device 30. By way of example, as the trigger generated by the trigger generation unit, exemplified are a predetermined input to the touch panel (for example, the touch panel 23a) and the voice input device constituting the input unit 23, the crown 35a and the push buttons 35b and 35c constituting the operation unit 35, and the like, detection of predetermined information (physical quantity) by the acceleration sensor, the illuminance sensor, the temperature sensor, the voltage sensor, the positioning device, and the like constituting the detection units 24 and 36, a clocking result obtained by the clocking unit 33, and the like. When the applet including the trigger block is executed by the processing unit (the processing units 27 and 39) of the operation target device (the first terminal device 20, the second terminal device 30), the trigger block causes the trigger generation unit defined by the trigger block to generate the trigger.

The action block is a computer program that defines content of an action for outputting output information corresponding to the service content and an action execution unit that executes the action, and causes the action execution unit to execute the action. Herein, the action is an operation corresponding to the content of the service provided by the applet, and executed by the action execution unit. The action execution unit is provided in the operation target device (the first terminal device 20 or the second terminal device 30) to execute the action. By way of example, as an action execution unit candidate that may constitute the action execution unit in the first terminal device 20 and the second terminal device 30 constituting the operation target device, exemplified are the communication unit 22 and the output unit 25 of the first terminal device 20, the indicator 3, the communication unit 32, the driving unit 34, and the output unit 37 of the second terminal device 30, and the like. By way of example, as the action executed by the action execution unit, exemplified are output of the output information to the outside by the communication units 22 and 32, output of the output information by the display (for example, the display 25a), the pilot lamp, the speaker/alarm buzzer, the vibrator, the indicator 3, the driving unit 34, and the like constituting the output units 25 and 37, and the like. When the applet including the action block is executed by the processing unit (the processing units 27 and 39) of the operation target device (the first terminal device 20, the second terminal device 30), the action block causes the action execution unit defined by the action block to execute the action for outputting the output information.

The applet configured as described includes the service block, the trigger block, and the action block described above, and defines the output information corresponding to the service content, the trigger, and the action in association with each other. When being executed by the processing unit (the processing units 27 and 39) of the operation target device (the first terminal device 20, the second terminal device 30), the applet can cause the action execution unit to execute the action of outputting the output information corresponding to the service content by the trigger generated by the trigger generation unit.

In a case of causing the operation target devices to cooperate with each other to perform a predetermined operation, the applet causes the operation target devices to cooperate each other to generate the trigger by the trigger generation unit, acquire/generate information related to the output information, and execute the action by the action execution unit. In this case, starting from trigger generation by a first operation target device, for example, the applet causes a second operation target device to acquire the output information corresponding to the service content or information for generating the output information from the external device 10 in accordance with the trigger. The applet then causes the output information acquired or generated by the second operation target device to be transmitted to the first operation target device, for example, and causes the first operation target device to execute the action of outputting the output information corresponding to the service content.

In a case of causing the operation target device to independently perform a predetermined operation, the applet causes the operation target device to generate the trigger by the trigger generation unit, acquire/generate the information related to the output information, and execute the action by the action execution unit. In this case, starting from trigger generation by the operation target device, for example, the applet causes the operation target device to acquire the output information corresponding to the service content or information for generating the output information from the external device, and causes the operation target device to execute the action of outputting the acquired output information corresponding to the service content or the generated output information. In the applet, each of the service block, the trigger block, and the action block may include a plurality of the block programs. In other words, in one applet, a plurality of pieces of the output information may be defined by the service block, a plurality of the triggers may be defined by the trigger block, and a plurality of the actions may be defined by the action block.

Applet Storage Region of First Terminal Device, and Acquisition of Applet

The first terminal device 20 according to the present embodiment stores the applet configured as described above in the storage unit 26. As described above, the storage unit 26 includes a plurality of slots 26S as storage regions that are divided to individually store the applet. The first terminal device 20 can individually store the applet in each of the slots 26S, and can store a plurality of the applets in the storage unit 26 with this configuration.

For example, the external device 10 described above stores a plurality of the applets that are created and published by the user himself/herself, another user, an entrepreneur providing a service, another entrepreneur, and the like. The first terminal device 20 can download an optional applet from the external device 10 via the communication unit 22 and the network N in accordance with an input to the input unit 23 and control by the processing unit 27. The first terminal device 20 then stores the applet downloaded from the external device 10 in each of the slots 26S. Alternatively, the first terminal device 20 may read the applet from a storage medium in which the applet that is created and published by the user himself/herself, another user, an entrepreneur, and the like is previously stored, and store the applet in each of the slots 26S. Furthermore, the first terminal device 20 may also be used as a creation terminal device at the same time as described later to directly store, in each of the slots 26S, the applet that is created by the user himself/herself with the first terminal device 20 using a software development kit and the like.

Switching Operation of Starting Applet

The second terminal device 30 according to the present embodiment can switch the applet as a starting execution target to be actually started and executed among the applets stored in the storage unit 26 of the first terminal device 20. In this case, for example, the second terminal device 30 can cause the operation unit 35 to function as an applet switching operation unit. The second terminal device 30 transmits a slot switching signal to the first terminal device 20 via the communication unit 32 by being controlled by the processing unit 39 in accordance with an operation input to the operation unit 35. The slot switching signal is a signal for switching the slot 26S of the applet as the starting execution target. When receiving the slot switching signal from the second terminal device 30 via the communication unit 22, the first terminal device 20 switches the slot 26S of the applet as the starting execution target. For example, each time a pressing-down operation is performed on the push button 35c, the processing unit 39 of the second terminal device 30 transmits the slot switching signal to the first terminal device 20 via the communication unit 32. Each time the slot switching signal is received from the second terminal device 30 via the communication unit 22, the processing unit 27 of the first terminal device 20 successively switches the slot 26S of the applet as the starting execution target in order that is determined in advance. The processing units 27 and 39 then execute the applet stored in the slot 26S that is selected as the starting execution target from among the slots 26S as described above. The first terminal device 20 can cause the input unit 23 to function as the applet switching operation unit in place of the operation unit 35 of the second terminal device 30, or together with the operation unit 35 of the second terminal device 30.

Trigger Generation Unit and Action Execution Unit of Second Terminal Device

As described above, the second terminal device 30 according to the present embodiment includes a plurality of the trigger generation unit candidates (the clocking unit 33, the operation unit 35, the detection unit 36, and the like) as candidates for the trigger generation unit. In the second terminal device 30, the trigger generation unit to be actually operated is defined by the trigger block of the applet stored in the first terminal device 20 among the trigger generation unit candidates. Similarly, as described above, the second terminal device 30 according to the present embodiment includes a plurality of the action execution unit candidates (the indicator 3 (the second hand 3a, the minute hand 3b, and the hour hand 3c), the communication unit 32, the driving unit 34, the output unit 37, and the like) as the candidates for the action execution unit. In the second terminal device 30, the action execution unit to be actually operated is defined by the action block of the applet stored in the first terminal device 20 among the action execution unit candidates. Herein, in the second terminal device 30, the trigger generation unit and the action execution unit are defined by the trigger block and the action block of the applet stored in the slot 26S that is selected as the starting execution target from among the applets stored in the slots 26S.

Creation of Applet

The content of the trigger, the content of the action, the trigger generation unit, and the action execution unit that are defined by the trigger block and the action block are respectively selected to be set as appropriate from among the trigger generation unit candidates and the action execution unit candidates at the time of creating the applet including the trigger block and the action block. The applet is, for example, created by the creation terminal device. As the creation terminal device, various terminals can be used. For example, the first terminal device 20 described above can also be used as the creation terminal device at the same time. The creation terminal device can perform processing of creating the applet cooperating with a block program management device (that may also be used as the external device 10 at the same time, for example) that stores the block program for creating the applet.

For example, the creation terminal device selects a desired service block, trigger block, and action block from among the block programs (a selection candidate service block, a selection candidate trigger block, and a selection candidate action block) stored in the block program management device in accordance with an input to the input unit. At this point, the creation terminal device can extract the selection candidate service block, the selection candidate trigger block, and the selection candidate action block that can be selected by the operation target device based on product information and the like of the operation target device that is caused to execute the applet to be created. In this case, for example, the creation terminal device acquires product information with which a device type and the like of the operation target can be specified via short-range wireless communication and the like from the operation target device as the creation target of the applet, and transmits the acquired product information to the block program management device. The block program management device then specifies the trigger generation unit candidate and the action execution unit candidate included in the operation target device specified by the product information, and the content of the trigger and the content of the action that can be implemented based on the received product information. The block program management device then transmits, to the creation terminal device, information about the selection candidate trigger block and the selection candidate action block corresponding to the specified trigger generation unit candidate, action execution unit candidate, content of the trigger, and content of the action. With this configuration, the creation terminal device can be caused to select the trigger block and the action block to be actually incorporated into the applet from among the selection candidate trigger block and the selection candidate action block that are selected and extracted by the block program management device in accordance with the product information transmitted to the block program management device. As a result, the creation terminal device can be caused to easily select the trigger block and the action block that can be implemented by the operation target device as the creation target of the applet. Regarding the selection candidate service block, information about the selection candidate service block of desired service content is transmitted to the creation terminal device from the block program management device in accordance with an operation on the creation terminal device. The creation terminal device can create the applet by combining the selected service block, trigger block, and action block. The creation terminal device then selects the desired service block, trigger block, and action block based on various kinds of information received from the block program management device, and can create the applet by combining the selected service block, trigger block, and action block. The creation terminal device can upload the created applet to the external device 10 or the block program management device.

Basic Operation of Applet

In the cooperation system S1 configured as described above, the processing unit 27 of the first terminal device 20 according to the present embodiment can perform processing of acquiring the output information defined by the service block or information for generating the output information from the external device 10 in accordance with the trigger generated by the trigger generation unit of the second terminal device 30. The processing unit 27 can perform processing of generating an action command for causing the action execution unit defined by the action block to execute the action based on the acquired output information or output information generated from the information for generating the output information. The second terminal device 30 according to the present embodiment includes the action execution unit that executes the action by an action command, and the processing unit 27 according to the present embodiment performs processing of transmitting the generated action command to the second terminal device 30. The following describes a specific example of an operation performed by the applet with reference to FIG. 5, FIG. 6, and FIG. 7.

First Specific Example of Operation Sequence Performed by Applet

Figure 5:
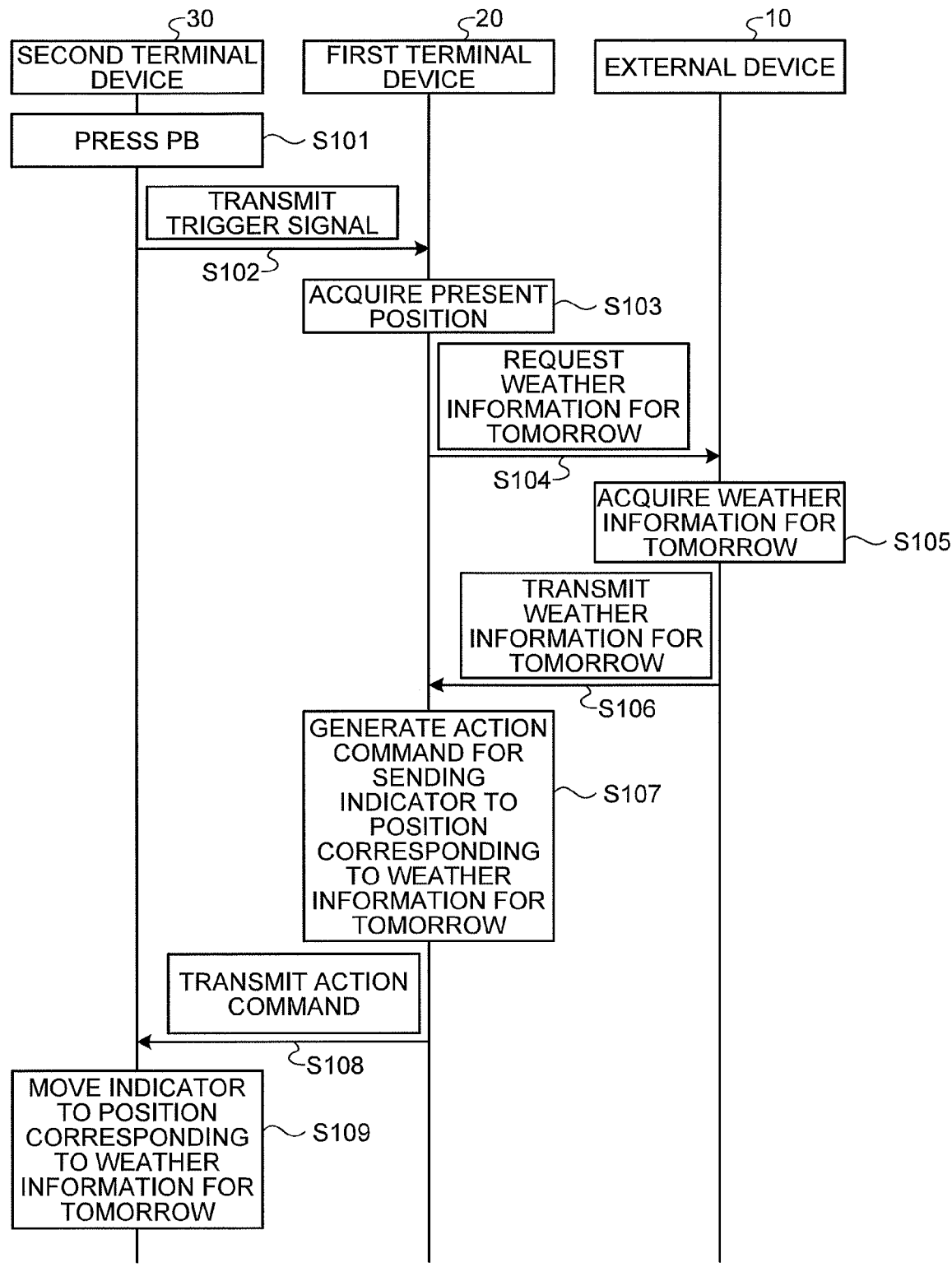
FIG. 5 is a diagram illustrating a specific example of an operation sequence performed by an application program of the cooperation system according to the first embodiment.

The following describes a first specific example of an operation sequence performed by the applet with reference to FIG. 5. With reference to FIG. 5, described is a case in which the output information corresponding to the service content defined by the service block is "weather information for tomorrow", the trigger defined by the trigger block (in other words, the trigger for starting to acquire the output information) is "a pressing-down operation on the push button 35b of the second terminal device 30", and the action defined by the action block is "display by driving the indicator of the second terminal device 30". That is, in this case, the trigger generation unit candidates of the second terminal device 30 include at least the operation unit 35 as an input unit that receives an input to the second terminal device 30, and the push button 35b of the operation unit 35 is set as the trigger generation unit by the trigger block. The trigger corresponds to a predetermined input to the push button 35b. The action execution unit defined by the action block is the indicator 3 that performs an action of indicating the output information, and the action herein is indicating the output information by the indicator 3.

In the example illustrated in FIG. 5, when the user performs a pressing-down operation on the push button (PB) 35b (trigger generation unit) in a state in which the applet is started and executed (Step S101), the processing unit 39 of the second terminal device 30 transmits a trigger signal to the first terminal device 20 via the communication unit 32 triggered by the pressing-down operation (Step S102).

When receiving the trigger signal from the second terminal device 30 by the communication unit 22, the processing unit 27 of the first terminal device 20 acquires a present position (latitude, longitude, and the like) of the first terminal device 20 by the positioning device constituting the detection unit 24 (Step S103). The processing unit 27 then transmits an output information request for requesting weather information for tomorrow at the present position that is acquired as described above to the external device 10 via the communication unit 22 (Step S104).

When receiving the output information request from the first terminal device 20 by the communication unit 12, the processing unit 14 of the external device 10 acquires the weather information for tomorrow at the present position of the first terminal device 20 from the storage unit 13 or another device (Step S105). The processing unit 14 then transmits the weather information for tomorrow as the output information to the first terminal device 20 via the communication unit 22 (Step S106).

When receiving the weather information for tomorrow as the output information from the external device 10 by the communication unit 22, the processing unit 27 of the first terminal device 20 generates an action command for causing the action execution unit to execute the action based on the output information (Step S107). In this case, the processing unit 27 generates, as an action command, command values related to a rotation direction of the indicator 3, the number of steps, moving speed, and a motor driving frequency of the motor 34a, an operation pattern of the indicator 3, and the like for sending the indicator 3 as the action execution unit to a position corresponding to the weather information for tomorrow. For example, in a case in which the weather for tomorrow is sunny, the processing unit 27 generates an action command for causing the second hand 3a to stop at a twelve o'clock position. In a case in which the weather for tomorrow is cloudy, the processing unit 27 generates an action command for causing the second hand 3a to stop at a three o'clock position. In a case in which the weather for tomorrow is rain, the processing unit 27 generates an action command for causing the second hand 3a to stop at a six o'clock position. The processing unit 27 then transmits the action command that is generated as described above to the second terminal device 30 via the communication unit 22 (Step S108).

When receiving the action command from the first terminal device 20 by the communication unit 32, the processing unit 39 of the second terminal device 30 causes the indicator 3 (the second hand 3a and the like) as the action execution unit to operate based on the action command, and causes the indicator 3 to move to the position corresponding to the weather information for tomorrow (Step S109). As a result, in the second terminal device 30, the indicator 3 executes the action of displaying (outputting) the weather information for tomorrow as the output information.

Second Specific Example of Operation Sequence Performed by Applet

Figure 6:
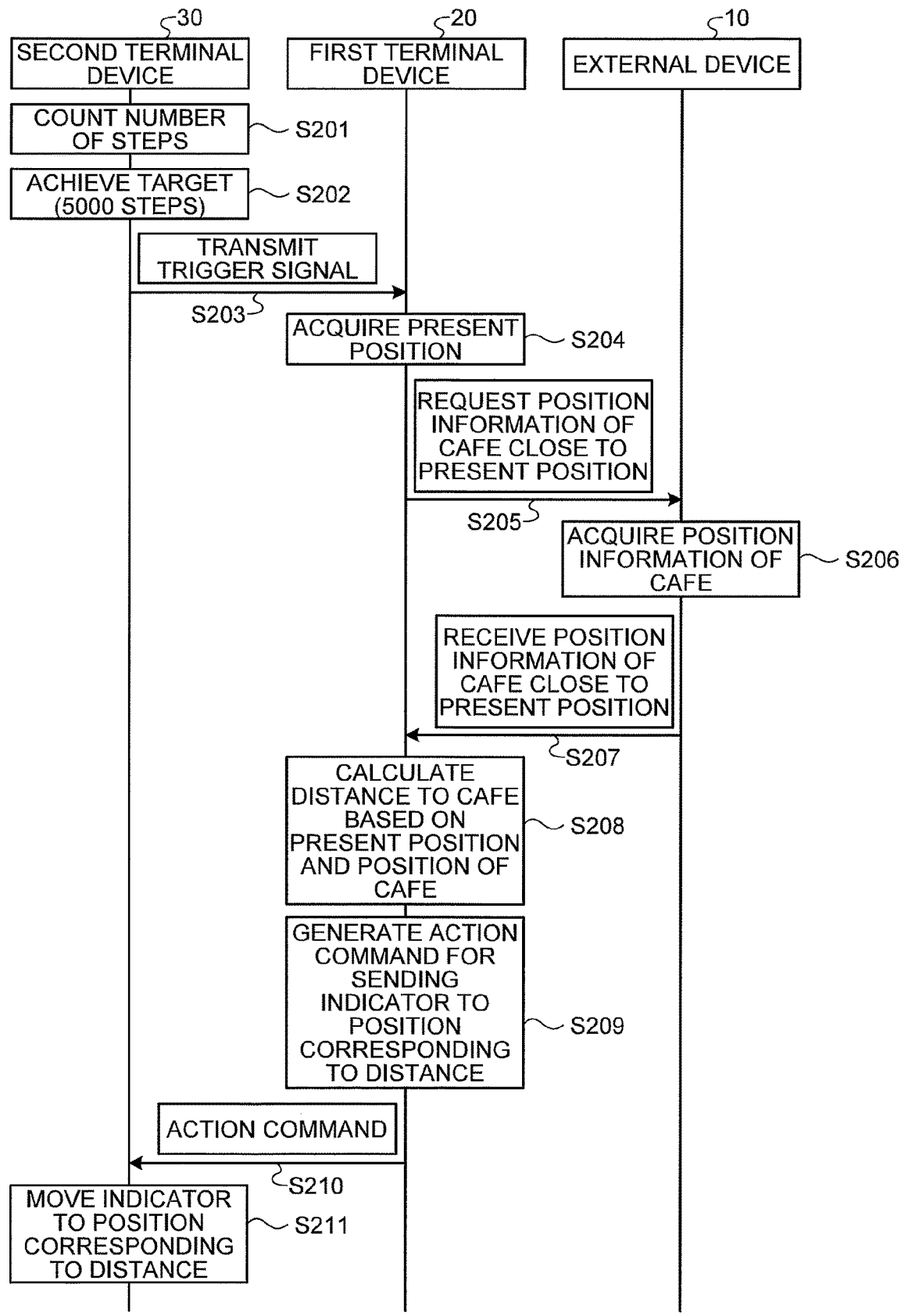
FIG. 6 is a diagram illustrating a specific example of the operation sequence performed by the application program of the cooperation system according to the first embodiment.

Next, the following describes a second specific example of the operation sequence performed by the applet with reference to FIG. 6. With reference to FIG. 6, described is a case in which the output information corresponding to the service content defined by the service block is "distance information to a cafe close to the present position", the trigger defined by the trigger block (in other words, the trigger for starting to acquire the output information) is "detection of 5000 steps by the acceleration sensor constituting the detection unit 36 of the second terminal device 30", and the action defined by the action block is "display by driving the indicator of the second terminal device 30". That is, in this case, the trigger generation unit candidates of the second terminal device 30 include at least the detection unit 36 that detects physical quantity in the second terminal device 30, and the acceleration sensor of the detection unit 36 is set as the trigger generation unit by the trigger block. The trigger corresponds to the condition that the number of steps corresponding to the physical quantity detected by the acceleration sensor reaches 5000 steps as a value determined in advance. The action execution unit defined by the action block is the indicator 3 that executes the action of indicating the output information, and the action herein is indicating the output information by the indicator 3.

In the example illustrated in FIG. 6, the processing unit 39 of the second terminal device 30 starts to count the number of steps of walking by the user with the acceleration sensor (trigger generation unit) constituting the detection unit 36 in a state in which the applet is started and executed (Step S201). When the number of steps detected by the acceleration sensor reaches 5000 steps as a target number of steps and the target number of steps is achieved (Step S202), the processing unit 39 transmits a trigger signal to the first terminal device 20 via the communication unit 32 triggered by the detection of 5000 steps by the acceleration sensor (Step S203).

When receiving the trigger signal from the second terminal device 30 by the communication unit 22, the processing unit 27 of the first terminal device 20 acquires the present position (latitude, longitude, and the like) of the first terminal device 20 by the positioning device constituting the detection unit 24 (Step S204). The processing unit 27 then transmits, to the external device 10 via the communication unit 22, an output information request for requesting position information of the cafe close to the present position that is acquired as described above (Step S205).

When receiving the output information request from the first terminal device 20 by the communication unit 12, the processing unit 14 of the external device 10 acquires the position information of the cafe close to the present position of the first terminal device 20 from the storage unit 13 or another device (Step S206). The processing unit 14 then transmits the position information of the cafe close to the present position as information for generating the output information to the first terminal device 20 via the communication unit 22 (Step S207).

When receiving the position information of the cafe close to the present position from the external device 10 by the communication unit 22, the processing unit 27 of the first terminal device 20 calculates the distance to the cafe as the output information based on the present position and the position of the cafe close to the present position (Step S208). The processing unit 27 then generates an action command for causing the action execution unit to execute the action based on the output information (Step S209). In this case, the processing unit 27 generates, as the action command, command values related to a rotation direction of the indicator 3, the number of steps, moving speed, a motor driving frequency of the motor 34a, an operation pattern of the indicator 3, and the like for sending the indicator 3 as the action execution unit to the position corresponding to the distance that is calculated as described above. For example, the processing unit 27 generates an action command for causing the second hand 3a to stop at a predetermined position on a dial plate in accordance with the distance to the cafe that is calculated. The processing unit 27 then transmits the action command that is generated as described above to the second terminal device 30 via the communication unit 22 (Step S210).

When receiving the action command from the first terminal device 20 by the communication unit 32, the processing unit 39 of the second terminal device 30 causes the indicator 3 (the second hand 3a and the like) as the action execution unit to operate based on the action command, and causes the indicator 3 to move to the position corresponding to the distance to the cafe from the present position (Step S211). As a result, in the second terminal device 30, the indicator 3 executes the action of displaying (outputting) the distance information to the cafe close to the present position as the output information.

Another Example of Operation Sequence Performed by Applet

Figure 7:
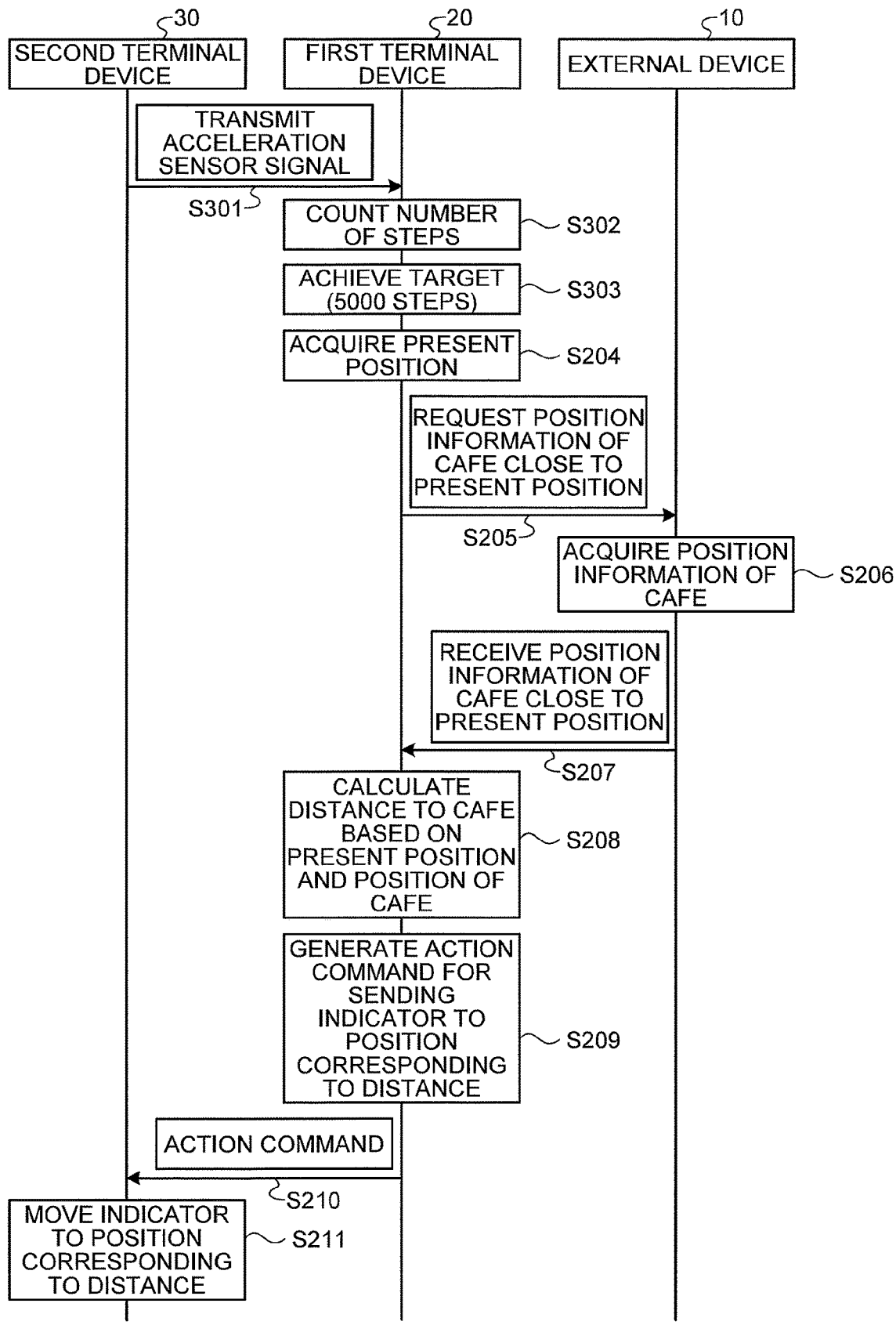
FIG. 7 is a diagram illustrating another example of the operation sequence performed by the application program of the cooperation system according to the first embodiment.

The cooperation system S1 described above can also use an applet for causing the first terminal device 20 to generate the trigger instead of the second terminal device 30 in addition to the applet described above. The example illustrated in FIG. 7 is different from the second specific example described with reference to FIG. 6 in that the trigger generation unit is disposed on the first terminal device 20 side. In the example illustrated in FIG. 7, the processing unit 39 of the second terminal device 30 transmits a sensor signal of acceleration detected by the acceleration sensor constituting the detection unit 36 to the first terminal device 20 via the communication unit 32 in a state in which the applet is started and executed (Step S301). The processing unit 39 continuously transmits the sensor signal of acceleration that is detected by the acceleration sensor for each control period to the first terminal device 20 in accordance with a sensing period as occasion demands. When receiving the sensor signal of acceleration from the second terminal device 30 by the communication unit 22, the processing unit 27 of the first terminal device 20 counts the number of steps of walking by the user in accordance with the sensor signal of acceleration (Step S302). When the counted number of steps reaches 5000 steps as the target number of steps and the target number of steps is achieved (Step S303), the processing unit 27 (trigger generation unit) acquires the present position (latitude, longitude, and the like) of the first terminal device 20 by the positioning device constituting the detection unit 24 triggered by counting of 5000 steps by the processing unit 27 (Step S204). The operation sequence following the Step S204 is substantially the same as the operation sequence of the second specific example described above with reference to FIG. 6, so that detailed description thereof will not be repeated. The cooperation system S1 according to the present embodiment can also use an applet that causes the operation as described above to be performed.

In addition to the applets described above, for example, the cooperation system S1 can also use an applet that causes the first terminal device 20 to execute the action while causing the second terminal device 30 to generate the trigger. That is, the processing unit 27 may be configured to be able to perform, in addition to the processing described above, processing of causing the action execution unit of the first terminal device 20 to execute the action by the action command that is generated based on the output information. Furthermore, the cooperation system S1 can also use an applet that causes the first terminal device 20 to perform both of generation of the trigger and execution of the action. That is, in addition to the processing described above, the processing unit 27 can further perform processing of acquiring the output information defined by the service block, or information for generating the output information from the external device 10 in accordance with the trigger generated by the trigger generation unit of the first terminal device 20. The processing unit 27 can perform processing of generating the action command for causing the action execution unit defined by the action block to execute the action, and causing the action execution unit of the first terminal device 20 to execute the action by the action command based on the acquired output information or output information generated from the information for generating the output information.

Working Effect of Embodiment

The cooperation system S1 described above includes the first terminal device 20 and the second terminal device 30. The first terminal device 20 stores the applet including the service block, the trigger block, and the action block. The second terminal device 30 can communicate with the first terminal device 20, and the trigger generation unit is defined by the trigger block from among the trigger generation unit candidates. The first terminal device 20 can communicate with the external device 10, and acquires the output information defined by the service block or the information for generating the output information from the external device 10 in accordance with the trigger generated by the trigger generation unit of the second terminal device 30. The first terminal device 20 then generates the action command for causing the action execution unit defined by the action block to execute the action based on the acquired output information or output information generated from the information for generating the output information. As a result, the cooperation system S1, the first terminal device 20, and the second terminal device 30 can properly provide the service.

For example, in the cooperation system S1, the second terminal device 30 is configured such that the trigger generation unit is selectively defined by the trigger block from among the trigger generation unit candidates, so that generation of the trigger by the trigger generation unit can be diversified. With this configuration, the cooperation system S1, the first terminal device 20, and the second terminal device 30 can implement diverse services.

In the cooperation system S1, the trigger is generated in accordance with behavior of the user by the second terminal device 30, the output information and required information are transmitted/received to/from the first terminal device 20 and the external device 10 in accordance with the trigger, and the action execution unit is caused to execute the action by the action command generated on the first terminal device 20 side. With this configuration, for example, the cooperation system S1 can suppress a data communication amount between the devices while distributing a calculation load on the entire system to the first terminal device 20, the second terminal device 30, and the external device 10.

As a result, the cooperation system S1, the first terminal device 20, and the second terminal device 30 can properly provide the service as described above.

Specifically, in the cooperation system S1 described above, the first terminal device 20 converts the output information into the action command for causing the action execution unit of the second terminal device 30 to output the output information, and the action command is transmitted to the second terminal device 30. As a result, the cooperation system S1 can execute the action of outputting the output information by the action execution unit of the second terminal device 30 that has received the action command. With this configuration, the cooperation system S1 can suppress the data communication amount between the devices while distributing the calculation load on the entire system to the first terminal device 20, the second terminal device 30, and the external device 10.

By way of example, in the cooperation system S1 described above, the trigger generation unit candidates of the second terminal device 30 include the operation unit 35 as an input unit that receives an input to the second terminal device 30 and the detection unit 36 that detects physical quantity in the second terminal device 30. In a case in which the operation unit 35 is set as the trigger generation unit, the trigger is that an input determined in advance is performed on the operation unit 35. On the other hand, in a case in which the detection unit 36 is set as the trigger generation unit, the trigger is that the physical quantity detected by the detection unit 36 reaches a value determined in advance. In this way, the cooperation system S1 can diversify generation of the trigger by the trigger generation unit, and can implement more diverse services.

In the cooperation system S1 described above, the first terminal device 20 stores a plurality of the applets, and the applet to be executed can be switched by the second terminal device 30. With this configuration, in the cooperation system S1, the applet to be actually executed can be selected from among the applets stored in the first terminal device 20 via the second terminal device 30 with one action, so that convenience can be improved, and a frequent switching operation can be preferably performed, for example.

Furthermore, the cooperation system S1 described above is configured such that the action execution unit is also selectively defined by the action block from among the action execution unit candidates in the second terminal device 30, so that execution of the action by the action execution unit can also be diversified. Also from this viewpoint, the cooperation system S1 can implement more diverse services.

Herein, the cooperation system S1 described above is configured such that the action execution unit of the second terminal device 30 includes the indicator 3 that indicates the output information. With this configuration, the cooperation system S1 can cause the second terminal device 30 to execute the action of outputting the output information with a simple configuration.

Second Embodiment

A cooperation system according to a second embodiment is different from that in the first embodiment in that the cooperation system according to the second embodiment includes a plurality of the second terminal devices. In the following description, the same constituent elements as those in the embodiment described above are denoted by the same reference numerals, and redundant description about the same configurations, operations, and effects will be omitted as much as possible (the same applies to the following).

Figure 8:
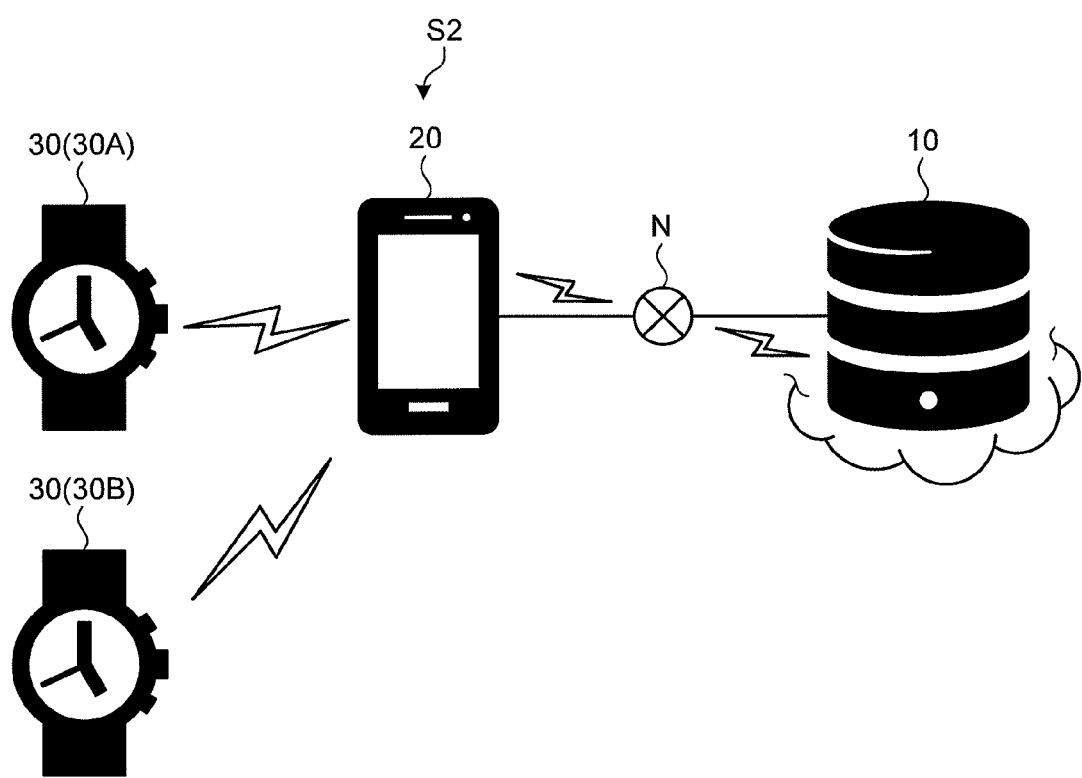
FIG. 8 is a block diagram illustrating a schematic configuration of a cooperation system according to a second embodiment.

A cooperation system S2 according to the present embodiment illustrated in FIG. 8 is different from the cooperation system S1 described above in that the cooperation system S2 includes a plurality of the second terminal devices 30. Other configurations of the cooperation system S2 are substantially the same as those of the cooperation system S1. The second terminal devices 30 are configured such that the second terminal device 30 in which the trigger generation unit is defined by the trigger block and the second terminal device 30 in which the action execution unit is defined by the action block are different from each other. That is, the cooperation system S2 according to the present embodiment uses an applet that causes the different second terminal devices 30 to generate the trigger and execute the action, respectively. The cooperation system S2 according to the present embodiment includes two second terminal devices 30.

In the following description, in a case of distinguishing the two second terminal devices 30 from each other, they may be respectively referred to as a "second terminal device 30A" and a "second terminal device 30B" for convenience's sake. In a case in which the two second terminal devices 30 are not required to be distinguished from each other, they may be simply referred to as "second terminal devices 30".

In the cooperation system S2, the trigger generation unit is defined in the second terminal device 30A on one side by the trigger block, and the action execution unit is defined in the second terminal device 30B on the other side by the action block. The two second terminal devices 30A and 30B are both analog electronic watches having substantially the same configuration. The two second terminal devices 30A and 30B are both paired with the first terminal device 20 in a communicable manner in accordance with various pairing operations. The following describes a specific example of an operation performed by the applet according to the present embodiment with reference to FIG. 9.

Third Specific Example of Operation Sequence Performed by Applet

Figure 9:
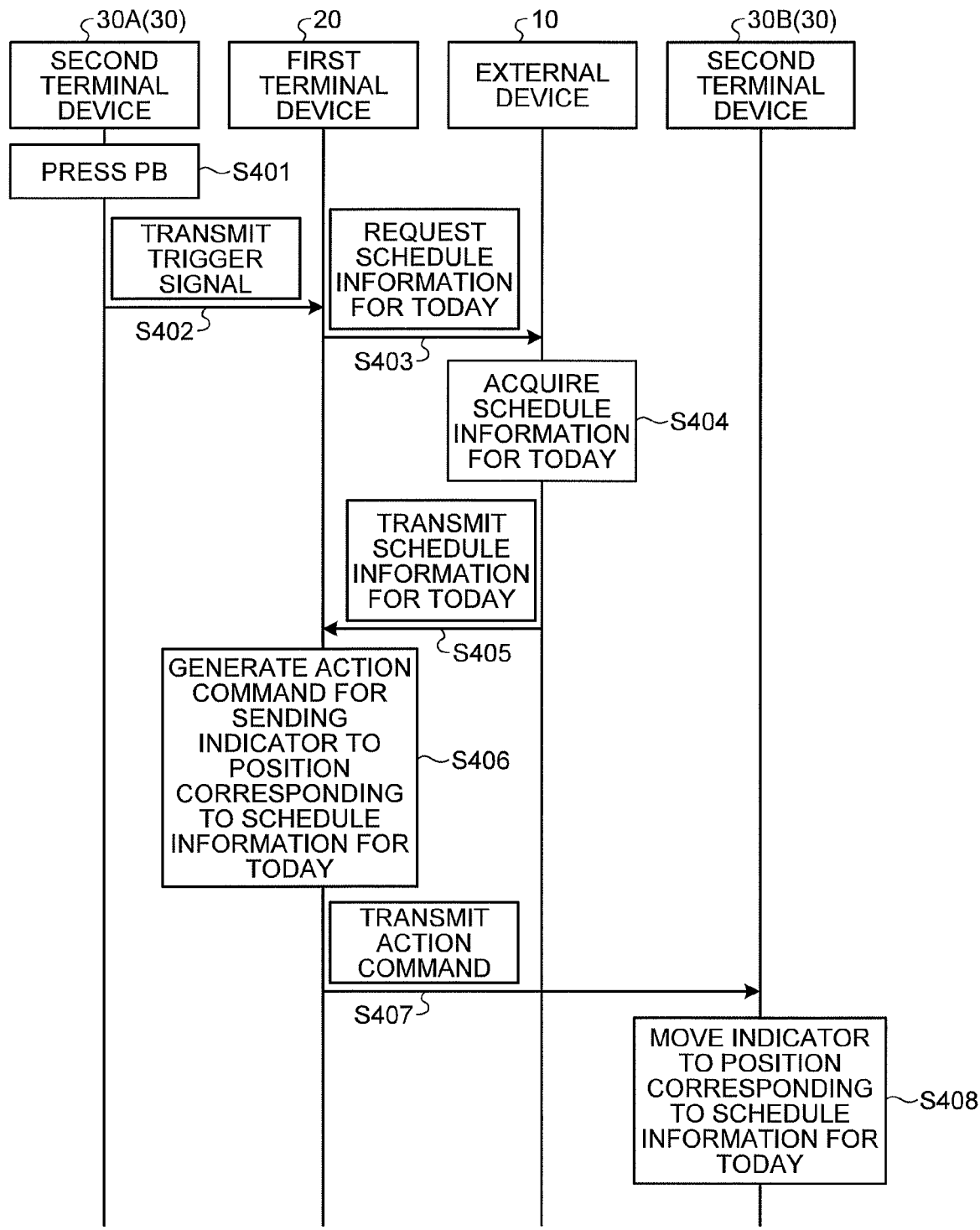
FIG. 9 is a diagram illustrating a specific example of an operation sequence performed by an application program of the cooperation system according to the second embodiment.

The following describes a third specific example of the operation sequence performed by the applet with reference to FIG. 9. With reference to FIG. 9, described is a case in which the output information corresponding to the service content defined by the service block is "schedule information for today", the trigger defined by the trigger block (in other words, a trigger for staring to acquire the output information) is "a pressing-down operation on the push button 35b of the second terminal device 30A", and the action defined by the action block is "display by driving the indicator of the second terminal device 30B". In this case, as a preparation in advance, the processing unit 27 of the first terminal device 20 previously registers various schedules such as a scheduled start time of an optional event of the user in the storage unit 13 of the external device 10 via the input unit 23 in a state in which the applet is started and executed.

In the example illustrated in FIG. 9, when the user performs a pressing-down operation on the push button (PB) 35b (trigger generation unit) in a state in which the applet is started and executed (Step S401), the processing unit 39 of the second terminal device 30A transmits a trigger signal to the first terminal device 20 via the communication unit 32 triggered by the pressing-down operation (Step S402).

When receiving the trigger signal from the second terminal device 30 via the communication unit 22, the processing unit 27 of the first terminal device 20 transmits an output information request for requesting schedule information for today to the external device 10 via the communication unit 22 (Step S403).

When receiving the output information request from the first terminal device 20 by the communication unit 12, the processing unit 14 of the external device 10 acquires schedule information for today from the information that is previously registered in the storage unit 13 by the first terminal device 20 (Step S404). The processing unit 14 then transmits the schedule information for today as the output information to the first terminal device 20 via the communication unit 22 (Step S405).

When receiving the schedule information for today as the output information from the external device 10 by the communication unit 22, the processing unit 27 of the first terminal device 20 generates an action command for causing the action execution unit to execute the action based on the output information (Step S406). In this case, the processing unit 27 generates, as the action command, command values related to a rotation direction of the indicator 3, the number of steps, moving speed, and a motor driving frequency of the motor 34a, an operation pattern of the indicator 3, and the like for sending the indicator 3 as the action execution unit to the position corresponding to the schedule information for today. For example, in a case in which a "conference" is registered as a schedule for today, the processing unit 27 generates an action command for causing the second hand 3a to stop at the twelve o'clock position (corresponding to a position representing the "conference") ten minutes before a start time of the conference. In a case in which a "business trip" is registered as the schedule for today, the processing unit 27 generates an action command for causing the second hand 3a to stop at the three o'clock position (corresponding to a position representing the "business trip") ten minutes before a departure time for the business trip. The processing unit 27 then transmits the action command generated as described above to the second terminal device 30B via the communication unit 22 (Step S407).

When receiving the action command from the first terminal device 20 by the communication unit 32, the processing unit 39 of the second terminal device 30B causes the indicator 3 (the second hand 3a and the like) as the action execution unit to operate based on the action command, and causes the indicator 3 to move to the position corresponding to the schedule information for today (Step S408). As a result, in the second terminal device 30B, the indicator 3 executes the action of displaying (outputting) the schedule information for today as the output information.

Working Effect of Embodiment

The cooperation system S2 described above can properly provide the service similarly to the cooperation system S1.

The cooperation system S2 described above can cause a plurality of the second terminal devices 30 to cooperate with each other to implement trigger generation and action execution, so that more diverse services can be implemented.

Third Embodiment

A cooperation system according to a third embodiment is different from that in the second embodiment in that the cooperation system according to the third embodiment further includes a plurality of the first terminal devices.

Figure 10:
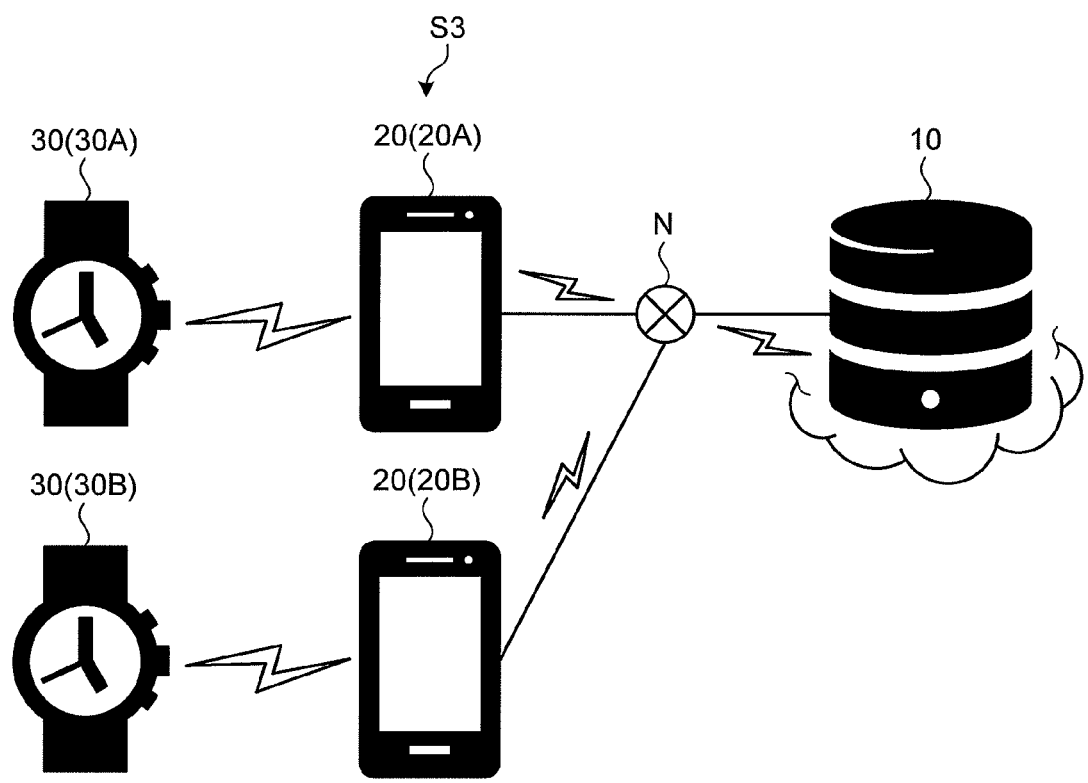
FIG. 10 is a block diagram illustrating a schematic configuration of a cooperation system according to a third embodiment.

A cooperation system S3 according to the present embodiment illustrated in FIG. 10 is different from the cooperation system S2 described above in that the cooperation system S3 further includes a plurality of the first terminal devices 20. Other configurations of the cooperation system S3 are substantially the same as those of the cooperation system S2. The first terminal devices 20 according to the present embodiment are configured such that an action command generated by any one of the first terminal devices 20 is relayed by the other one of the first terminal devices 20 to be transmitted to the second terminal device 30. That is, the cooperation system S3 according to the present embodiment uses an applet with which the action command generated by any one of the first terminal devices 20 is relayed by the other one of the first terminal devices 20 to be transmitted to the second terminal device 30. The cooperation system S3 according to the present embodiment includes two first terminal devices 20.

In the following description, in a case of distinguishing the two first terminal devices 20 from each other, they may be respectively referred to as a "first terminal device 20A" and a "first terminal device 20B" for convenience's sake. In a case in which the two first terminal devices 20 are not required to be distinguished from each other, they may be simply referred to as "first terminal devices 20".

The two first terminal devices 20A and 20B are both smartphones having substantially the same configuration. In the cooperation system S3, the first terminal device 20A is paired with the second terminal device 30A in a communicable manner, and the first terminal device 20B is paired with the second terminal device 30B in a communicable manner in accordance with various pairing operations. The following describes a specific example of an operation performed by the applet according to the present embodiment with reference to FIG. 11.

Fourth Specific Example of Operation Sequence Performed by Applet

Figure 11:
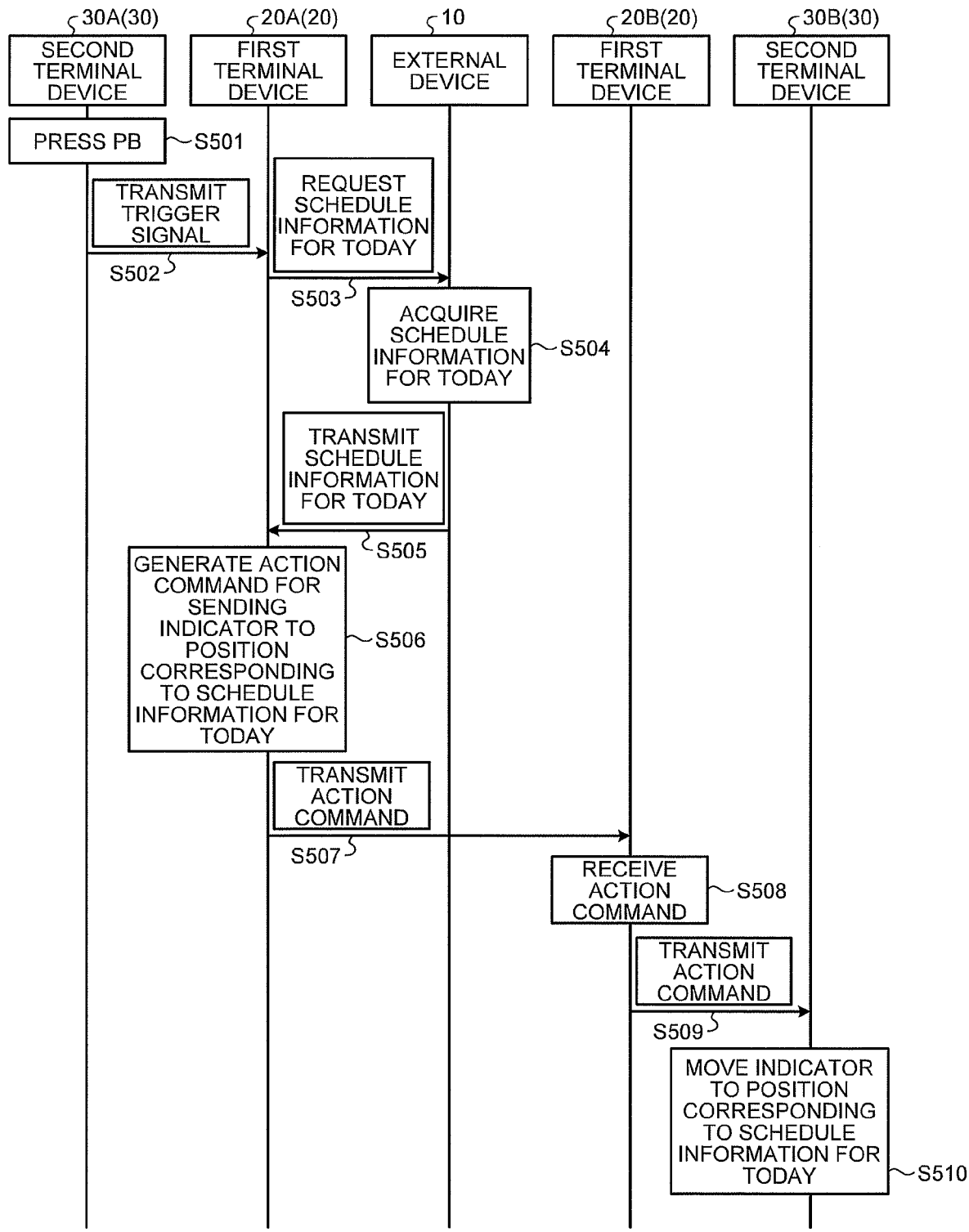
FIG. 11 is a diagram illustrating a specific example of an operation sequence performed by an application program of the cooperation system according to the third embodiment.

The following describes a fourth specific example of the operation sequence performed by the applet with reference to FIG. 11. In the example illustrated in FIG. 11, when the user performs a pressing-down operation on the push button (PB) 35b (trigger generation unit) in a state in which the applet is started and executed (Step S501), the processing unit 39 of the second terminal device 30A transmits a trigger signal to the first terminal device 20A via the communication unit 32 triggered by the pressing-down operation (Step S502).

When receiving the trigger signal from the second terminal device 30A by the communication unit 22, the processing unit 27 of the first terminal device 20A transmits an output information request for requesting the schedule information for today to the external device 10 via the communication unit 22 (Step S503).

When receiving the output information request from the first terminal device 20A by the communication unit 12, the processing unit 14 of the external device 10 acquires the schedule information for today from the information that is previously registered in the storage unit 13 by the first terminal device 20A or the first terminal device 20B (Step S504). The processing unit 14 then transmits the schedule information for today as the output information to the first terminal device 20A via the communication unit 22 (Step S505).

When receiving the schedule information for today as the output information from the external device 10 by the communication unit 22, the processing unit 27 of the first terminal device 20A generates an action command for causing the action execution unit to execute the action based on the output information (Step S506). The processing unit 27 then transmits the action command generated as described above to the first terminal device 20B via the communication unit 22 (Step S507).

When receiving the action command from the first terminal device 20A by the communication unit 22 (Step S508), the processing unit 27 of the first terminal device 20B transmits the received action command to the second terminal device 30B via the communication unit 22 (Step S509).

When receiving the action command from the first terminal device 20B by the communication unit 32, the processing unit 39 of the second terminal device 30B causes the indicator 3 (the second hand 3a and the like) as the action execution unit to operate based on the action command, and causes the indicator 3 to move to a position corresponding to the schedule information for today (Step S510). As a result, in the second terminal device 30B, the indicator 3 executes the action of displaying (outputting) the schedule information for today as the output information.

Working Effect of Embodiment

The cooperation system S3 described above can properly provide the service similarly to the cooperation system S1 and the like. The cooperation system S3 described above can further cause a plurality of the first terminal devices 20 to cooperate with each other to relay the action command to the second terminal device 30, so that more diverse services can be implemented.

Modification of Third Embodiment

Figure 12:
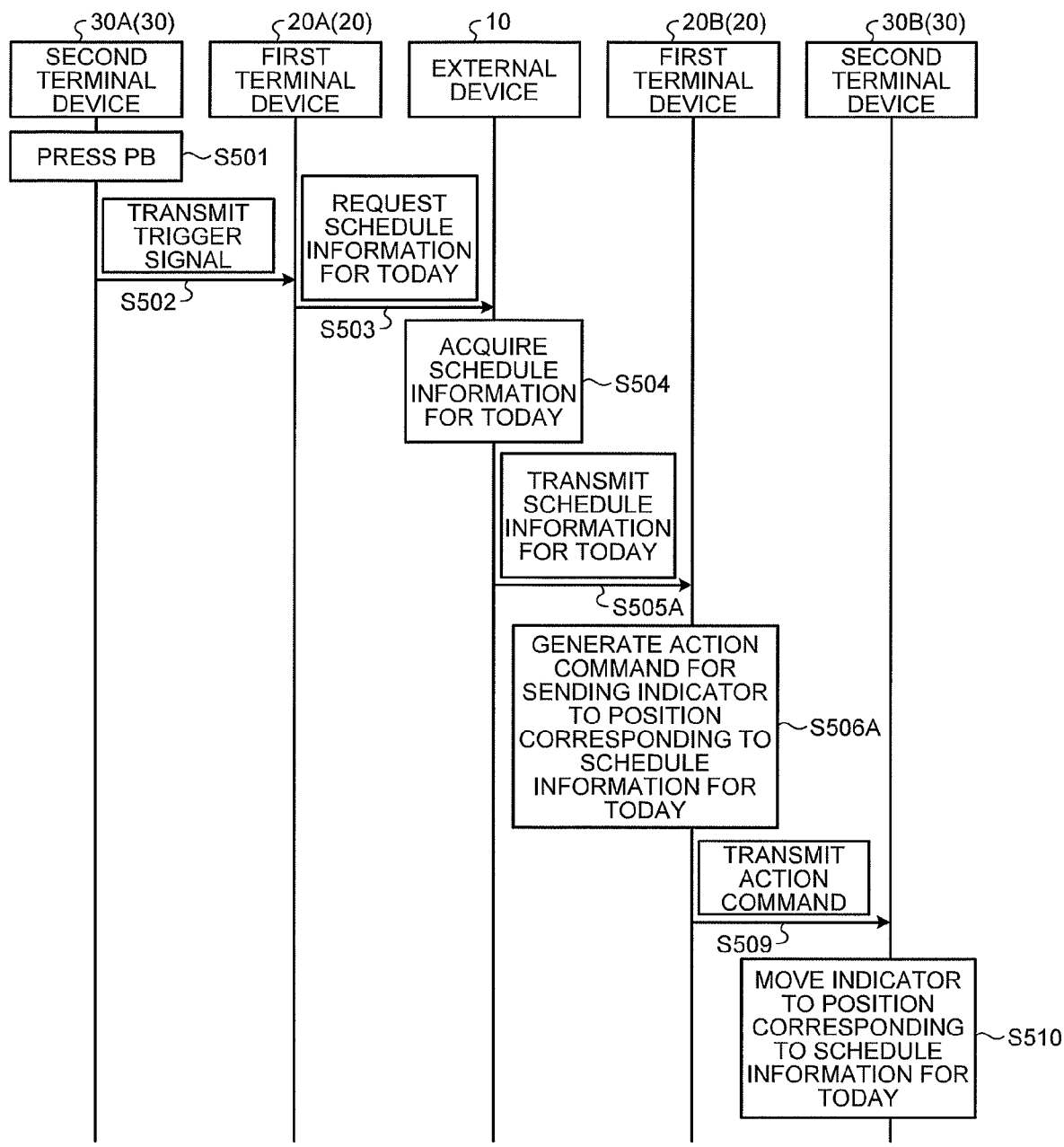
FIG. 12 is a diagram illustrating a specific example of the operation sequence performed by the application program of the cooperation system according to a modification of the third embodiment.

The cooperation system S3 including a plurality of the first terminal devices 20 and a plurality of the second terminal devices 30 can operate as illustrated in FIG. 12 as a modification. The first terminal devices 20 according to the present modification are configured such that the first terminal device 20 that inquires of the external device 10 the output information or the information for generating the output information in accordance with the trigger generated by the trigger generation unit is different from the first terminal device 20 that acquires the output information or the information for generating the output information from the external device 10, generates the action command based on the acquired information, and transmits the action command to the second terminal device 30 including the action execution unit. That is, the cooperation system S2 according to the present modification uses an applet for causing the different first terminal devices 20 to inquire of the external device 10 the information and to acquire the information from the external device 10, respectively. The following describes a specific example of an operation performed by the applet according to the present modification with reference to FIG. 12.

Fifth Specific Example of Operation Sequence Performed by Applet

The following intensively describes differences from the fourth specific example described above. When acquiring the schedule information for today through the processing at Step S504 (Step S504), the processing unit 14 of the external device 10 transmits the schedule information for today to the first terminal device 20B as the output information (Step S505A). This first terminal device 20B is the first terminal device 20 different from the first terminal device 20A that has transmitted the output information request for requesting the schedule information for today to the external device 10. The transmission of the output information request by the first terminal device 20A described above corresponds to inquiry about the output information or the information for generating the output information.

When receiving the schedule information for today as the output information from the external device 10 by the communication unit 22, the processing unit 27 of the first terminal device 20B generates an action command for causing the action execution unit to execute the action based on the output information (Step S506A). The processing unit 27 then transmits the generated action command to the second terminal device 30B via the communication unit 22 (Step S509). The reception of the schedule information for today by the first terminal device 20B described above corresponds to acquisition of the output information or the information for generating the output information.

Working Effect of Modification

The cooperation system S3 according to the modification described above can properly provide the service similarly to the cooperation system S1 and the like. The cooperation system S3 according to the modification described above can further implement inquiry about the information to the external device 10 and acquisition of the information from the external device 10 by causing the first terminal devices 20 to cooperate with each other, so that more diverse services can be implemented.

The cooperation system, the first terminal device, and the second terminal device according to the embodiments of the present invention described above are not limited to the embodiments described above, and can be variously modified within the scope of CLAIMS.

The input unit of the second terminal device 30 described above may include a touch panel, an operation button, a voice input device, and the like in addition to the operation unit 35 similarly to the input unit 23.

In the above description, the external device 10 is configured as a single device, but is not limited thereto. A form of function distribution of the external device 10 is not limited to that described above, and the functions can be functionally or physically distributed or integrated in optional units within a range in which similar effects or functions may be exhibited. The computer programs, various kinds of data, and the like described above may be updated as appropriate, or may be stored in another server that is connected to the external device 10 via the optional network N. The computer programs, various kinds of data, and the like described above can be recorded in a computer-readable recording medium such as a hard disk, a flexible disk (FD), a CD-ROM, an MO, and a DVD, and can be executed by being read out from the recording medium by a computer. For example, all or optional part of the processing functions of the processing units 14, 27, and 39 and the external device 10 may be implemented by a CPU and the like and a computer program that is interpreted and executed by the CPU and the like, or may be implemented as hardware based on wired logic and the like.

Modification of Applet

Each of the cooperation systems S1, S2, and S3 described above can also use an applet including at least one service block, one trigger block, and one action block as described above in which any one of or all of the service block, the trigger block, and the action block are constituted of a plurality of the block programs. That is, as described above, in one applet, a plurality of pieces of the output information may be defined by the service block, a plurality of the triggers may be defined by the trigger block, and a plurality of the actions may be defined by the action block.

First Modification of Applet: Plurality of Trigger Blocks

Figure 13:
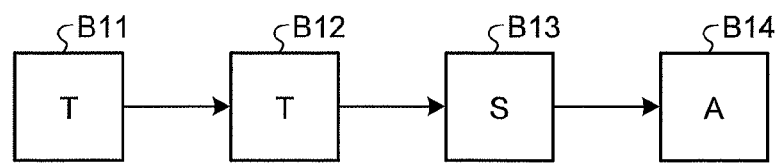
FIG. 13 is a schematic diagram illustrating an example of a combination of block programs in a cooperation system according to a modification.

For example, as exemplified in FIG. 13, the applet may include two trigger blocks. The applet exemplified in FIG. 13 includes a first trigger block B11, a second trigger block B12, one service block B13, and one action block B14. In this case, the following applet can be exemplified as a specific example of the applet, by way of example.

A first trigger defined by the first trigger block B11="a pressing-down operation on the push button 35b of the second terminal device 30"

A second trigger defined by the second trigger block B12="detection of the target number of steps (for example, 5000 steps) by the acceleration sensor constituting the detection unit 36 of the second terminal device 30"

The output information corresponding to the service content defined by the service block B13="position information of the cafe close to the present position"

The action defined by the action block B14="display by driving the indicator of the second terminal device 30"

In this case, the trigger generation unit candidates of the second terminal device 30 include at least the operation unit 35 and the detection unit 36, the push button 35b of the operation unit 35 is set as the first trigger generation unit by the first trigger block B11, and the acceleration sensor of the detection unit 36 is set as the second trigger generation unit by the second trigger block B12. The trigger corresponds to the condition that, after the pressing-down operation is performed on the push button 35b (first trigger), the number of steps corresponding to the physical quantity detected by the acceleration sensor of the detection unit 36 reaches the target number of steps (for example, 5000 steps) that is determined in advance (second trigger). The action execution unit defined by the action block B14 is the indicator 3 that executes the action of indicating the output information. In this case, the action is indicating the output information by the indicator 3, for example, indicating the position of the cafe close to the present position by the indicator 3.

Regarding the applet, in the modification, the operation target device (the first terminal device 20, the second terminal device 30) in which the first trigger generation unit is defined by the first trigger block B11 may be different from the operation target device (the first terminal device 20, the second terminal device 30) in which the second trigger generation unit is defined by the second trigger block B12.

Second Modification of Applet: Plurality of Service Blocks

Figure 14:
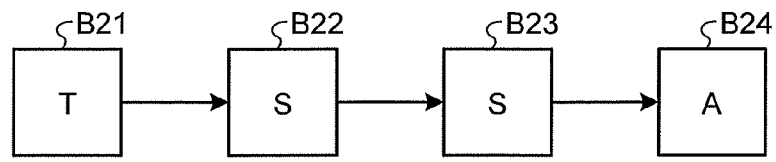
FIG. 14 is a schematic diagram illustrating an example of a combination of block programs in the cooperation system according to the modification.

As exemplified in FIG. 14, the applet may also include two service blocks. The applet exemplified in FIG. 14 includes one trigger block B21, a first service block B22, a second service block B23, and one action block B24. In this case, the following applet can be exemplified as a specific example of the applet by way of example.

The trigger defined by the trigger block B21="a pressing-down operation on the push button 35*b* of the second terminal device 30"

First output information corresponding to the service content defined by the first service block B22="weather information for tomorrow"

Second output information corresponding to the service content defined by the second service block B23="e-mail transmission/reception information for a specific person"

The action defined by the action block B24="display by driving the indicator of the second terminal device 30"

In this case, the trigger generation unit candidates of the second terminal device 30 includes at least the operation unit 35, and the push button 35*b* of the operation unit 35 is set as the trigger generation unit by the trigger block B21. The trigger corresponds to the condition that the pressing-down operation is performed on the push button 35*b*. The action execution unit defined by the action block B24 is the indicator 3 that executes the action of indicating the output information. In this case, the action is indicating the output information by the indicator 3, for example, when the weather information for today is transmitted to a specific person by e-mail and a reply is received from the specific person by e-mail, reporting that the weather information is transmitted by e-mail and the reply is received by e-mail by the position of the indicator 3.

Third Modification of Applet: Plurality of Action Blocks

Figure 15:
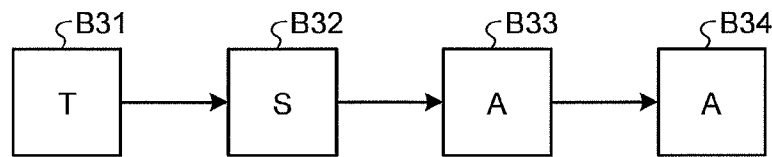
FIG. 15 is a schematic diagram illustrating an example of a combination of block programs in the cooperation system according to the modification.

As exemplified in FIG. 15, the applet may include two action blocks. The applet exemplified in FIG. 15 includes one trigger block B31, one service block B32, a first action block B33, and a second action block B34. In this case, the following applet can be exemplified as a specific example of the applet by way of example.

The trigger defined by the trigger block B31="a pressing-down operation on the push button 35*b* of the second terminal device 30"

The output information corresponding to the service content defined by the service block B32="weather for tomorrow/rainfall probability information"

A first action defined by the first action block B33 and a second action defined by the second action block B34=independent "display by driving the indicator of the second terminal device 30"

In this case, the trigger generation unit candidates of the second terminal device 30 include at least the operation unit 35, and the push button 35*b* of the operation unit 35 is set as the trigger generation unit by the trigger block B31. The trigger corresponds to the condition that the pressing-down operation is performed on the push button 35*b*. The action execution units defined by the first action block B33 and the second action block B34 are both the indicator 3 that executes the action of indicating the output information. In this case, the first action is indicating a position corresponding to the weather information for tomorrow by the indicator 3 as the output information, and the second action is indicating a position corresponding to the rainfall probability information for tomorrow by the indicator 3 as the output information when a predetermined time has elapsed after the first action. For example, in a case in which the weather for tomorrow is rain and the rainfall probability is 70%, the first action is causing the second hand 3*a* of the indicator 3 to stop at a position indicating rain (for example, a five o'clock position), and the second action is causing the second hand 3*a* to move and stop at a position indicating 70% (for example, at a seven o'clock position) after the first action.

Regarding the applet, in the present modification, the operation target device (the first terminal device 20, the second terminal device 30) in which a first action execution unit is defined by the first action block B33 may be different from the operation target device (the first terminal device 20, the second terminal device 30) in which a second action execution unit is defined by the second action block B34.

Modification of Creation of Applet

The applet as described above can be created by the creation terminal device such as the first terminal device 20 as described above. In the first terminal device 20 that is also used as the creation terminal device, for example, the processing unit 27 can create a desired applet in accordance with an input to the input unit 23 performed by an applet creator based on creation information that is acquired from a device such as an applet creation supporting device (that may also be used as the external device 10 at the same time, for example) via the communication unit 22. In this case, the creation information is various kinds of information that are referred to at the time when the applet is created. The creation information may include, for example, information about content of the output information corresponding to the service, content of the trigger, content of the action, candidates for the trigger generation unit, the action execution unit, and the like (the trigger generation unit candidate, the action execution unit candidate, and the like described above), and candidates for the service block, the trigger block, the action block, and the like constituting the applet (the selection candidate service block, the selection candidate trigger block, the selection candidate action block, and the like described above). The creation information may also include, for example, a computer program for creation for creating the applet (the software development kit and the like described above). In this case, the processing unit 27 may create the applet in accordance with the computer program for creation.

Figure 16:
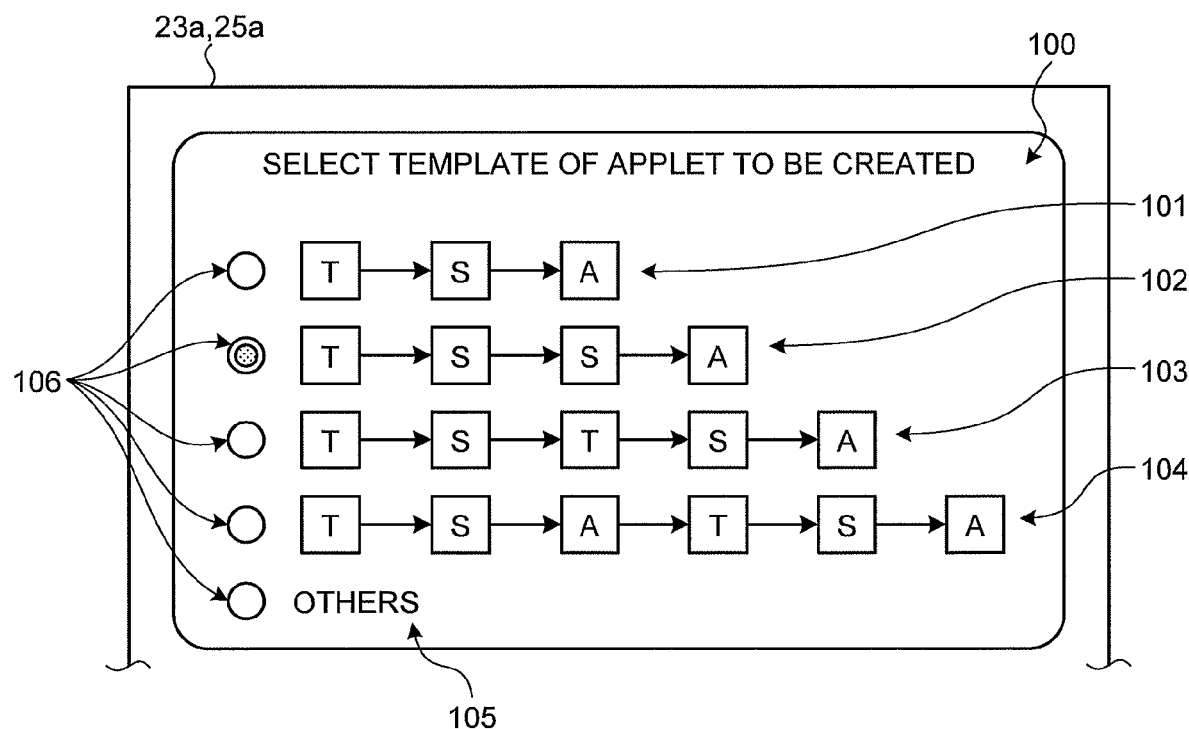
FIG. 16 is a schematic diagram illustrating an example of a template selection screen at the time of creating an application program in the cooperation system according to the modification.

In this case, for example, by causing the applet to be created by using a template selection screen 100 and the like exemplified in FIG. 16, the processing unit 27 enables a desired applet to be easily created. The processing unit 27 causes the display 25*a* to display the template selection screen 100 exemplified in FIG. 16 at the time of creating the applet.

The template selection screen 100 exemplified in FIG. 16 is a screen that is displayed for selecting a template of the applet to be created. On the template selection screen 100, for example, template images 101, 102, 103, 104, and 105, and template selection regions 106 are displayed together with a character image of "select a template of the applet to be created" and the like.

The template images 101, 102, 103, and 104 are images representing templates imitating combinations of the block programs constituting the applet to be created. The template image 101 is an image representing the template of the applet including one trigger block, one service block, and one action block. The template image 102 is an image representing the template of the applet including one trigger block, two service blocks, and one action block. The template image 103 is an image representing the template of the applet including two trigger blocks, two service blocks, and one action block. The template image 104 is an image representing the template of the applet including two trigger blocks, two service blocks, and two action blocks. The template image 105 is an image representing a template other than the templates described above, and includes a character image of "others" and the like.

The template selection regions 106 are regions that are selected at the time of determining a desired template, and in this case, motif images having a substantially elliptical shape are displayed therein. The template selection regions 106 are displayed on the side of the respective template images 101, 102, 103, 104, and 105 one by one corresponding to the respective template images 101, 102, 103, 104, and 105.

When any one of the template selection regions 106 is selected in accordance with a tap operation and the like performed on the touch panel 23*a* by a creator on the template selection screen 100 illustrated in FIG. 16, the processing unit 27 causes a display mode of the selected template selection region 106 to be different from a display mode of the other template selection regions 106. The example of FIG. 16 represents a state in which the template selection region 106 of the template image 102 is selected. In this case, the processing unit 27 causes the display modes to be different from each other by causing a display color of an inner side of the motif image of the selected template selection region 106 to be different from a display color of inner sides of the motif images of the other template selection regions 106.

In a case in which the template selection region 106 corresponding to any one of the template images 101, 102, 103, and 104 is selected on the template selection screen 100 illustrated in FIG. 16, the processing unit 27 determines, to be the template of the applet to be created, any of the templates represented by the template images 101, 102, 103, 104, and 105 corresponding to the selected template selection region 106.

In a case in which the template selection region 106 corresponding to the template image 105 is selected on the template selection screen 100 illustrated in FIG. 16, the processing unit 27 causes the screen to proceed to a screen for causing the creator to select an optional template other than the templates represented by the template images 101, 102, 103, and 104. In this case, the processing unit 27 causes the display 25*a* to display, for example, a block number input screen 200 as exemplified in FIG. 17 as the screen for causing the creator to select the optional template.

Figure 17:
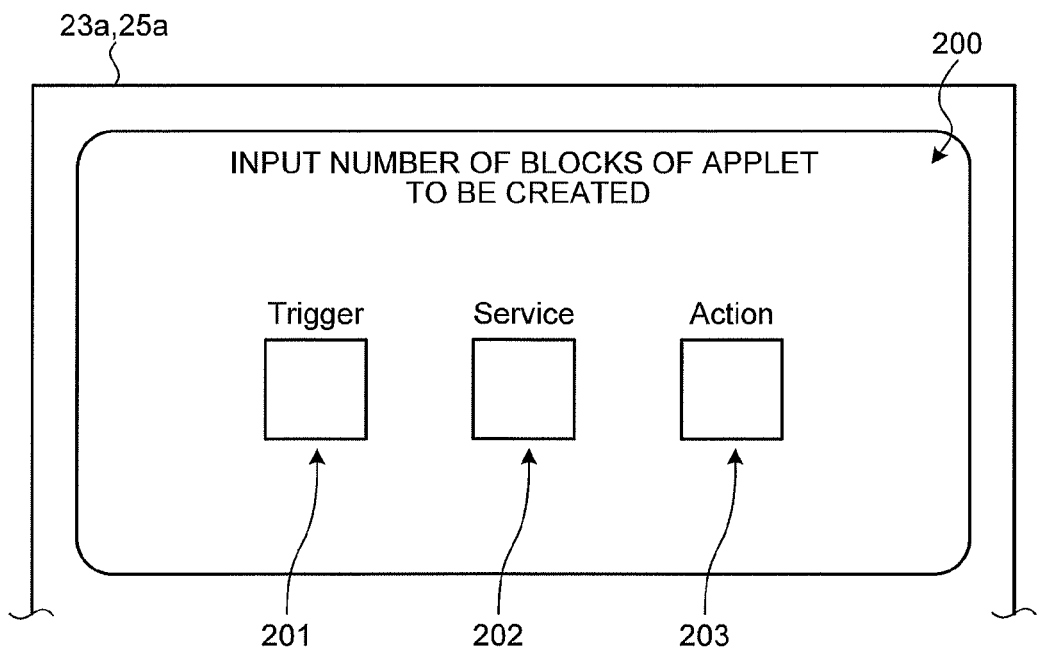
FIG. 17 is a schematic diagram illustrating an example of a block number input screen at the time of creating an application program in the cooperation system according to the modification.

The block number input screen 200 exemplified in FIG. 17 is a screen that is displayed for causing the creator to optionally input the number of the block programs used for the applet to be created. For example, a trigger block number input region 201, a service block number input region 202, and an action block number input region 203 are displayed on the block number input screen 200 together with a character image of "input the number of blocks of the applet to be created" and the like.

The trigger block number input region 201 is a region for inputting the number of trigger blocks used for the applet to be created, and an input frame image is displayed therein together with a character image of "Trigger" and the like in this case. The service block number input region 202 is a region for inputting the number of service blocks used for the applet to be created, and an input frame image is displayed therein together with a character image of "Service" and the like in this case. The action block number input region 203 is a region for inputting the number of action blocks used for the applet to be created, and an input frame image is displayed therein together with a character image of "Action" and the like in this case. Herein, the input frame image is an image having a substantially rectangular frame shape.

When the trigger block number input region 201 is selected in accordance with a tap operation and the like performed by the creator on the touch panel 23*a* on the block number input screen 200 exemplified in FIG. 17, for example, the processing unit 27 displays what is called a software keyboard in the block number input screen 200, and receives an input operation for "trigger block number" performed by the creator via the touch panel 23*a*. Similarly, when the service block number input region 202 is selected on the block number input screen 200 exemplified in FIG. 17, for example, the processing unit 27 receives an input operation for "service block number" performed by the creator. Furthermore, when the action block number input region 203 is selected on the block number input screen 200 exemplified in FIG. 17, for example, the processing unit 27 receives an input operation for "action block number" performed by the creator.

Figure 18:
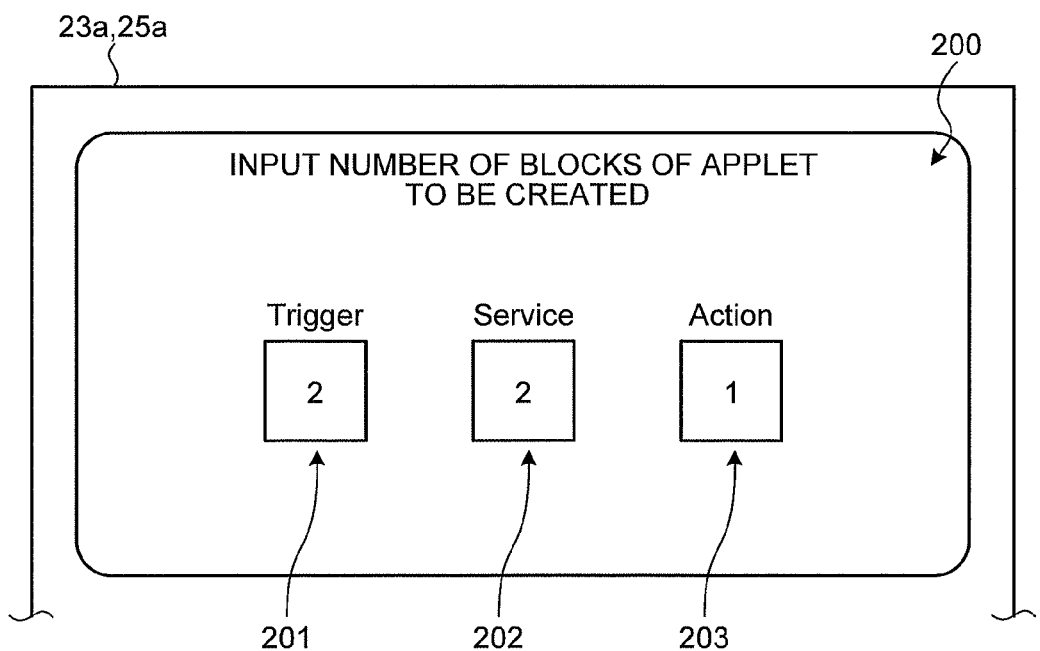
FIG. 18 is a schematic diagram illustrating an example of the block number input screen at the time of creating the application program in the cooperation system according to the modification.

By way of example, the block number input screen 200 exemplified in FIG. 18 represents a state in which "2" is input as the "trigger block number", "2" is input as the "service block number", and "1" is input as the "action block number". In this case, on the block number input screen 200 exemplified in FIG. 18, a character image of "2" is displayed in the input frame image of the trigger block number input region 201, a character image of "2" is displayed in the input frame image of the service block number input region 202, and a character image of "1" is displayed in the input frame image of the action block number input region 203.

The processing unit 27 then causes a template selection screen 300 exemplified in FIG. 19 to be displayed again in accordance with the input "trigger block number", "service block number", and "action block number".

Figure 19:
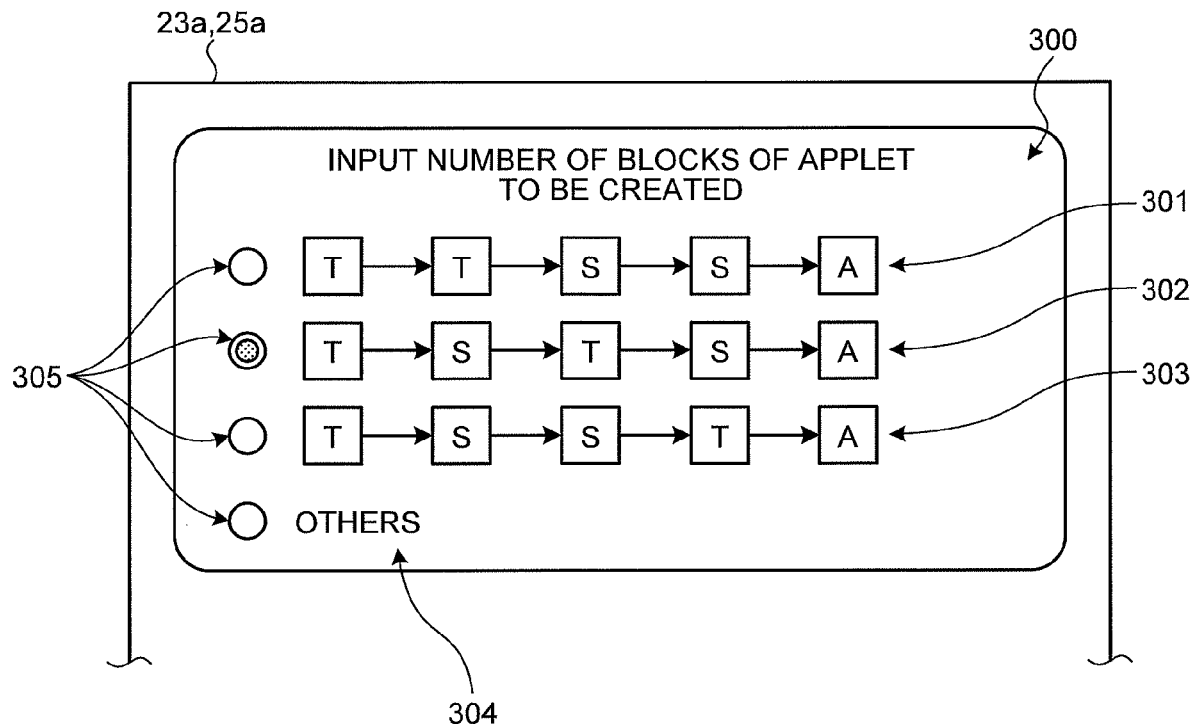
FIG. 19 is a schematic diagram illustrating an example of a template selection screen at the time of creating the application program in the cooperation system according to the modification.

The template selection screen 300 as exemplified in FIG. 19 is a screen that is displayed for selecting the template of the applet to be created similarly to the template selection screen 100 described above. Similarly to the template selection screen 100, for example, template images 301, 302, 303, and 304, and template selection regions 305 are displayed on the template selection screen 300 together with the character image of "select the template of the applet to be created" and the like.

Similarly to the template images 101, 102, 103, 104, and 105 described above, the template images 301, 302, 303, and 304 are images representing templates imitating combinations of the block programs constituting the applet to be created. However, the template images 301, 302, 303, and 304 are different from the template images 101, 102, 103, 104, and 105 described above in that the template images 301, 302, 303, and 304 are images representing templates corresponding to the "trigger block number", the "service block number", and the "action block number" that have been input as described above. In this case, each of the template images 301, 302, 303, and 304 is an image representing a template imitating an applet including two trigger blocks, two service blocks, and one action block. At the same time, arrangement order of the block programs is different among the template images 301, 302, 303, and 304. On the template selection screen 300 exemplified in FIG. 19, for example, displayed are the template images 301, 302, and 303 representing templates having standard arrangement order of the block programs the use frequency of which is relatively high. The template image 301 is an image representing a template having the arrangement order of the first trigger block, the second trigger block, the first service block, the second service block, and the action block. The template image 302 is an image representing a template having the arrangement order of the first trigger block, the first service block, the second trigger block, the second service block, and the action block. The template image 303 is an image representing a template having the arrangement order of the first trigger block, the first service block, the second service block, the second trigger block, and the action block. The template image 304 is an image for representing a template other than the templates described above, and includes a character image of "others" and the like.

Similarly to the template selection regions 106, the template selection regions 305 are regions that are selected at the time of determining a desired template, and motif images having a substantially elliptical shape are displayed therein. The template selection regions 305 are displayed on the side of the respective template images 301, 302, 303, and 304 one by one corresponding to the respective template images 301, 302, 303, and 304.

When any one of the template selection regions 305 is selected in accordance with a tap operation and the like performed on the touch panel 23a by the creator on the template selection screen 300 illustrated in FIG. 19, the processing unit 27 causes a display mode of the selected template selection region 305 to be different from a display mode of the other template selection regions 305 similarly to the template selection screen 100 described above.

In a case in which the template selection region 305 corresponding to any one of the template images 301, 302, and 303 is selected on the template selection screen 300 illustrated in FIG. 19, the processing unit 27 determines, to be the template of the applet to be created, any of the templates represented by the template images 301, 302, and 303 corresponding to the selected template selection region 305.

In a case in which the template selection region 305 corresponding to the template image 304 is selected on the template selection screen 300 illustrated in FIG. 19, the processing unit 27 causes the screen to proceed to a screen for causing the creator to select an optional template other than the templates represented by the template images 301, 302, and 303. In this case, the processing unit 27 may cause the display 25a to display, for example, an input screen on which the creator can optionally create and determine the template as the screen for causing the creator to select an optional template.

Figure 20:
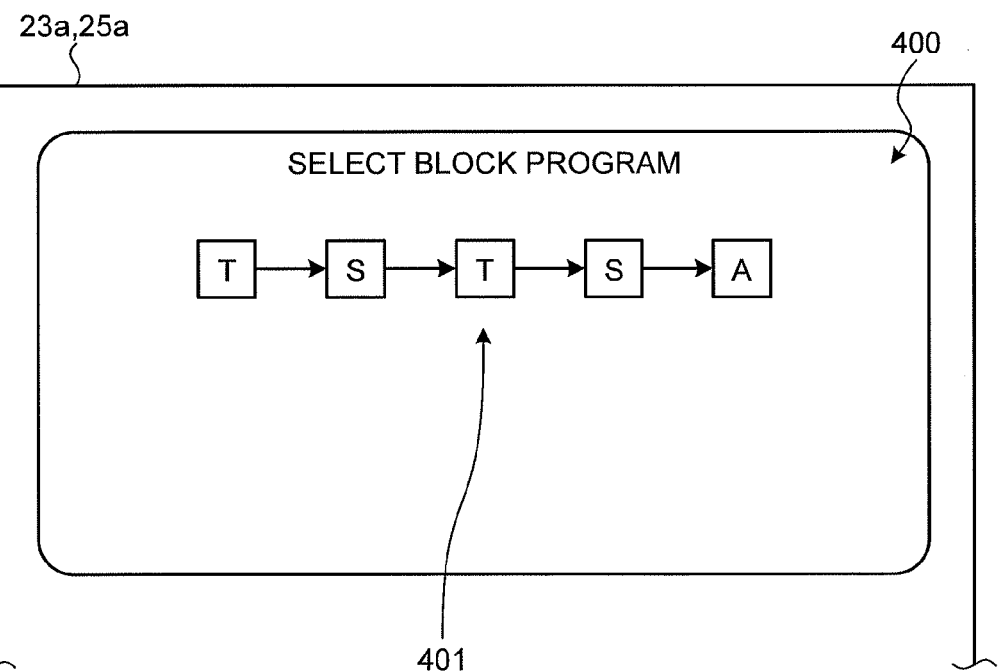
FIG. 20 is a schematic diagram illustrating an example of the template selection result screen at the time of creating the application program in the cooperation system according to the modification.

When the template of the applet to be created is determined as described above, the processing unit 27 causes the display 25a to display a template selection result screen 400 as exemplified in FIG. 20. The template selection result screen 400 exemplified in FIG. 20 is a screen on which the template of the applet that has been determined as described above is displayed. A determined template image 401 is displayed on the template selection result screen 400 together with a character image of "select a block program" and the like, for example.

The determined template image 401 is an image representing the template of the applet that has been determined as described above. In the example of FIG. 20, the determined template image 401 is an image representing a template having the arrangement order of the first trigger block, the first service block, the second trigger block, the second service block, and the action block (corresponding to the template image 302 exemplified in FIG. 19).

The processing unit 27 then performs processing of causing the desired service block, trigger block, and action block to be actually incorporated in the applet to be selected in order as described above in accordance with the determined template of the applet, and combining the blocks to create the applet corresponding to the template. As a result, the creation terminal device such as the first terminal device 20 can enable the applet desired by the creator to be easily created as described above.

The cooperation system, the first terminal device, and the second terminal device according to the present embodiment may be configured by combining the constituent elements of the embodiments and modifications described above as appropriate.

REFERENCE SIGNS LIST

3 INDICATOR
10 EXTERNAL DEVICE
11, 21, 31 POWER SUPPLY UNIT
12, 22, 32 COMMUNICATION UNIT
13, 26, 38 STORAGE UNIT
14, 27, 39 PROCESSING UNIT
20, 20A, 20B FIRST TERMINAL DEVICE (OPERATION TARGET DEVICE)
23 INPUT UNIT
23a TOUCH PANEL
24, 36 DETECTION UNIT
25, 37 OUTPUT UNIT
25a DISPLAY
26S SLOT
30, 30A, 30B SECOND TERMINAL DEVICE (OPERATION TARGET DEVICE)
33 CLOCKING UNIT
34 DRIVING UNIT
34a MOTOR
35 OPERATION UNIT (INPUT UNIT)
35a CROWN
35b, 35c PUSH BUTTON
100, 300 TEMPLATE SELECTION SCREEN
101, 102, 103, 104, 105, 301, 302, 303, 304 TEMPLATE IMAGE
106, 305 TEMPLATE SELECTION REGION
200 BLOCK NUMBER INPUT SCREEN
201 TRIGGER BLOCK NUMBER INPUT REGION
202 SERVICE BLOCK NUMBER INPUT REGION
203 ACTION BLOCK NUMBER INPUT REGION
400 TEMPLATE SELECTION RESULT SCREEN
401 DETERMINED TEMPLATE IMAGE
S1, S2, S3 COOPERATION SYSTEM

The invention claimed is:

1. A cooperation system comprising:
a first terminal device configured to store an application program including a service block program that defines output information output from an operation target device, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action; and a second terminal device that is configured to be able to communicate with the first terminal device and includes a plurality of trigger generation unit candidates as candidates for the trigger generation unit, the trigger generation unit being defined from among the trigger generation unit candidates by the trigger block program, wherein the first terminal device: (a) is configured to communicate with an external device to obtain the output information from the external device, (b) is configured to execute by combining the trigger block program, the service block program, and the action block program as the application program, each of the trigger block program, the service block program, and the action block program is selected from a plurality of selection candidates by a user, (c) configured to acquire the output information defined by the selected service block program or information for generating the output information from the external device, in accordance with the trigger generated by the trigger generation unit defined by the selected trigger block program, (d) generates an action command for indicating the obtained output information at the second terminal device, in accordance with the action execution unit defined by the selected action block program, and (e) transmits the generated action command to the second terminal device, the second terminal device includes the action execution unit that executes the action based on the action command, and causes the action execution unit defined by the selected action block program to execute the action based on the received action command, and when the action execution unit defined by the selected action block program is an indicator of the second terminal device, the action command is generated in accordance with the obtained information and corresponding to a content of the action of the selected action block program, includes a rotation direction of the indicator, the number of steps, moving speed and a motor driving frequency of a motor, and is a command value to cause the indicator to move to a position corresponding to the information.

2. The cooperation system according to claim 1, wherein the trigger generation unit candidates include an input unit configured to receive an input to the second terminal device, and the trigger is that an input determined in advance is performed on the input unit in a case in which the input unit is set as the trigger generation unit.

3. The cooperation system according to claim 1, wherein the trigger generation unit candidates include a detection unit configured to detect physical quantity in the second terminal device, and the trigger is that the physical quantity detected by the detection unit reaches a value determined in advance in a case in which the detection unit is set as the trigger generation unit.

4. The cooperation system according to claim 1, wherein the first terminal device stores a plurality of the application programs, and the second terminal device is able to switch the application programs to be executed.

5. The cooperation system according to claim 1, wherein the second terminal device includes a plurality of action execution unit candidates as candidates for the action execution unit, and the action execution unit is defined from among the action execution unit candidates by the action block program.

6. The cooperation system according to claim 1, further comprising:
a plurality of the second terminal devices, wherein
among the second terminal devices, the second terminal device in which the trigger generation unit is defined by the trigger block program is different from the second terminal device in which the action execution unit is defined by the action block program.

7. The cooperation system according to claim 1, further comprising:
a plurality of the first terminal devices, wherein
among the first terminal devices, the action command generated by any of the first terminal devices is relayed by another one of the first terminal devices to be transmitted to the second terminal device.

8. The cooperation system according to claim 1, further comprising:
a plurality of the first terminal devices, wherein
among the first terminal devices, the first terminal device configured to inquire of the external device the output information or the information for generating the output information in accordance with the trigger generated by the trigger generation unit is different from the first terminal device configured to acquire the output information or the information for generating the output information from the external device, generate the action command based on the acquired information, and transmit the action command to the second terminal device including the action execution unit.

9. The cooperation system according to claim 1, further comprising:
the external device configured to be able to communicate with the first terminal device.

10. A first terminal device comprising:
a storage unit configured to store an application program including a service block program that defines output information output from an operation target device, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action;

a communication unit configured to be able to communicate with an external device to obtain the output information from the external device, and a second terminal device including the action execution unit that executes the action based on the action command and including a plurality of trigger generation unit candidates as candidates for the trigger generation unit, the trigger generation unit being defined from among the trigger generation unit candidates by the trigger block program; and a processing unit configured to be able to execute by combining the trigger block program, the service block program, and the action block program as the application program, each of the trigger block program, the service block program, and the action block program being selected from a plurality of selection candidates by a user, to be able to perform processing of acquiring the output information defined by the selected service block program or information for generating the output information from the external device in accordance with the trigger generated by the trigger generation unit defined by the selected trigger block program, and generating an action command for indicating the obtained output information at the second terminal device, in accordance with the action execution unit defined by the selected action block program, and to be able to perform transmitting the generated action command to the second terminal device, wherein when the action execution unit defined by the selected action block program is an indicator of the second terminal device, the action command is generated in accordance with the obtained information and corresponding to a content of the action of the selected action block program, includes a rotation direction of the indicator, the number of steps, moving speed and a motor driving frequency of a motor, and is a command value to cause the indicator to move to a position corresponding to the information.

11. A second terminal device comprising:

a communication unit configured to be able to communicate with a first terminal device configured to store an application program including a service block program that defines output information obtained from an external device output from an operation target device, a trigger block program that defines content of a trigger for starting an action for outputting the output information and a trigger generation unit that generates the trigger to cause the trigger generation unit to generate the trigger, and an action block program that defines content of the action for outputting the output information and an action execution unit that executes the action to cause the action execution unit to execute the action;

the trigger generation unit; and the action execution unit, wherein the trigger generation unit is defined from among a plurality of trigger generation unit candidates as candidates for the trigger generation unit by the trigger block program, the first terminal device execute by combining the trigger block program, the service block program, and the action block program as the application program, each of the trigger block program, the service block program, and the action block program is selected from a plurality of selection candidates by a user, acquires the output information defined by the selected service block program or information for generating the output information from an external device in accordance with the trigger generated by the trigger generation unit defined by the selected trigger block program, and generates an action command for indicating the obtained output information at the second terminal device, in accordance with the action execution unit defined by the selected action block program, the action execution unit defined by the selected action block program executes the action by the action command that is received from the first terminal device by the communication unit, and when the action execution unit defined by the selected action block program is an indicator of the second terminal device, the action command is generated in accordance with the obtained information and corresponding to a content of the action of the selected action block program, includes a rotation direction of the indicator, the number of steps, moving speed and a motor driving frequency of a motor, and is a command value to cause the indicator to move to a position corresponding to the information.

\* \* \* \* \*